United States Patent
Tillgren et al.

(10) Patent No.: US 6,611,259 B1
(45) Date of Patent: Aug. 26, 2003

(54) SYSTEM AND METHOD FOR OPERATING AN ELECTRONIC READING DEVICE USER INTERFACE

(75) Inventors: Magnus Tillgren, Malmö (SE); Magnus Hollström, Lund (SE); Patrik Olsson, Malmö (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 75 days.

(21) Appl. No.: 09/703,506

(22) Filed: Oct. 31, 2000

Related U.S. Application Data

(60) Provisional application No. 60/182,742, filed on Feb. 16, 2000, provisional application No. 60/190,343, filed on Mar. 16, 2000, and provisional application No. 60/192,662, filed on Mar. 28, 2000.

(51) Int. Cl.[7] .............................................. G06K 11/06
(52) U.S. Cl. ........................................ 345/179; 178/18
(58) Field of Search ................................ 235/407, 494, 235/495; 345/175, 179, 178; 178/18.01, 19.01; 348/207, 325

(56) References Cited

U.S. PATENT DOCUMENTS

| | | | |
|---|---|---|---|
| 4,797,544 A | 1/1989 | Montgomery et al. | 250/221 |
| 5,416,312 A | 5/1995 | Lamoure | 235/494 |
| 5,442,147 A | 8/1995 | Burns et al. | 178/18 |
| 5,477,012 A | 12/1995 | Sekendur | 178/18 |
| 5,652,412 A | 7/1997 | Lazzouni et al. | 178/18 |
| 5,905,248 A | 5/1999 | Russell et al. | 235/462 |

FOREIGN PATENT DOCUMENTS

| | | |
|---|---|---|
| EP | 0 407 734 | 1/1991 |
| EP | 0 615 209 A | 9/1994 |
| EP | 0 717 367 | 6/1996 |
| GB | 2306669 | 5/1997 |
| WO | WO 94/10652 | 5/1994 |
| WO | WO 98/35336 | 8/1998 |
| WO | WO 99/35601 | 7/1999 |
| WO | WO 99/39277 | 8/1999 |
| WO | WO 99/60468 | 11/1999 |
| WO | WO 99/66441 | 12/1999 |
| WO | WO 00/00928 | 1/2000 |
| WO | WO 00/70551 | 11/2000 |
| WO | WO 01/48654 | 7/2001 |

OTHER PUBLICATIONS

PCT International Search Report for PCT/EP 01/01400 mailed Oct. 30, 2001.

*Primary Examiner*—Vijay Shankar
*Assistant Examiner*—Nitin Patel
(74) *Attorney, Agent, or Firm*—Jenkens & Gilchrist, P.C.

(57) ABSTRACT

A method and system for operating a user interface uses an electronic reading device to detect a portion of an address pattern. A client device receives data identifying the detected portion of the address pattern and uses the data to request a corresponding application description. The request is sent to an application server that retrieves the corresponding application description and forwards it to the client device. The application description includes an address pattern grid description that is further forwarded to the electronic reading device. The electronic reading device stores the grid description and uses it to identify positions corresponding to successively detected portions of the address pattern, to determine whether the positions are within the current grid description, to generate strokes from the positions, and to initiate actions based on the generated strokes. Action data is then sent to the client device, which processes the data in accordance with the application description.

62 Claims, 13 Drawing Sheets

Pen

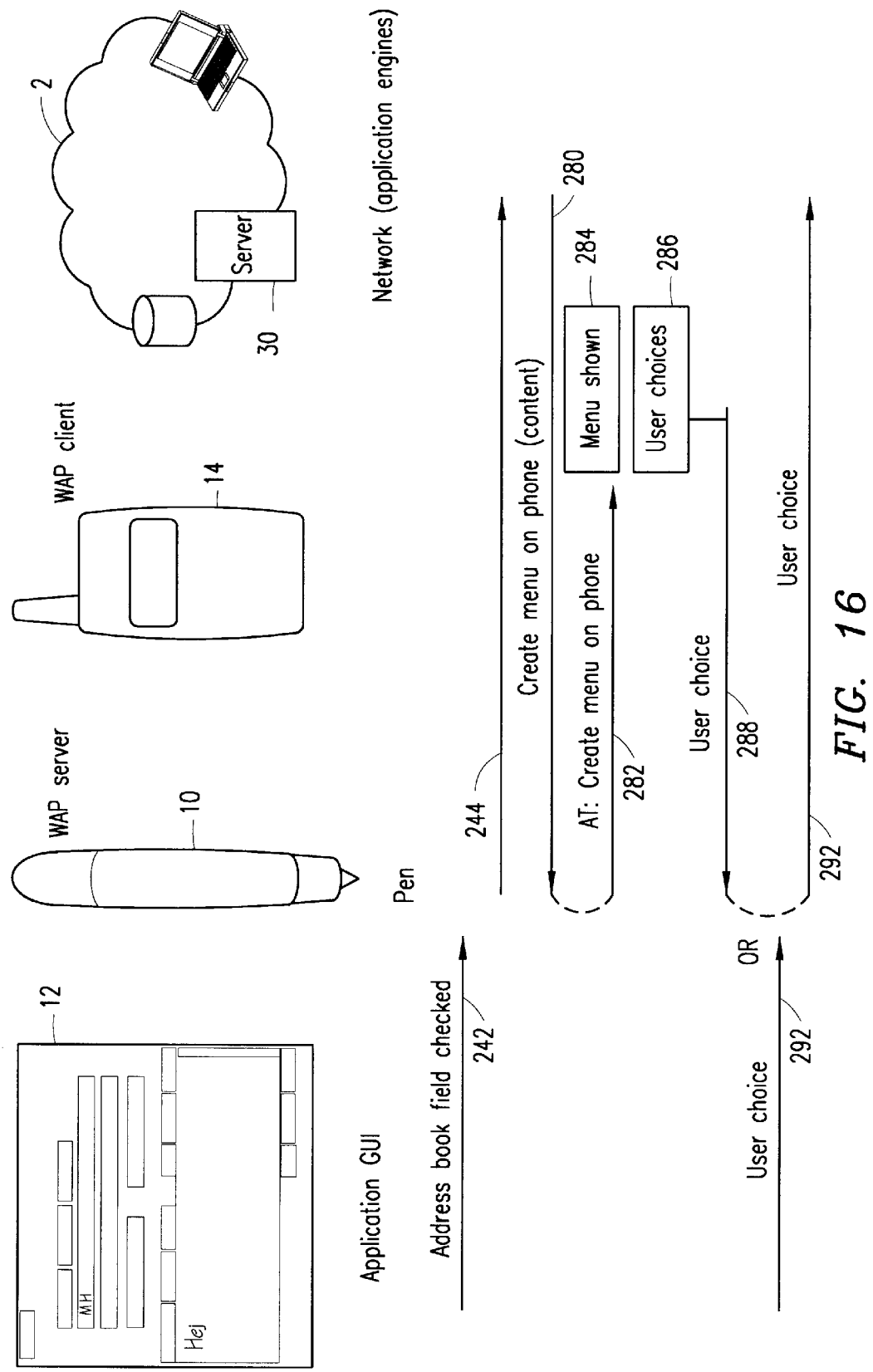

SYSTEM AND METHOD FOR OPERATING AN ELECTRONIC READING DEVICE USER INTERFACE

REFERENCE TO EARLIER FILED PROVISIONAL APPLICATIONS

The present application for patent is related to and hereby incorporates by reference the subject matter disclosed in U.S. patent application Ser. No. 09/703,497, entitled "Specially Formatted Paper Based Applications of a Mobile Phone"; U.S. patent application Ser. No. 09/703,503, entitled "Method and System for Using an Electronic Reading Device as a General application Input and Navigation Interface", U.S. patent application Ser. No. 09/703,704, entitled "Predefined Electronic Pen Applications in Specially Formatted Paper"; U.S. patent application Ser. No. 09/703,325, entitled "Method And System For Using an Electronic Reading Device on Non-paper Devices"; U.S. patent application Ser. No. 09/703,486, entitled "Multi-layer Reading Device", U.S. patent application Ser. No. 09/703,351, entitled "Method and System for Configuring and Unlocking an Electronic Reading Device"; U.S. patent application Ser. No. 09/703,485, entitled "Printer Pen"; U.S. patent application Ser. No. 09/703,492, entitled "Method and System for Electronically Recording Transactions and Performing Security Function"; U.S. patent application Ser. No. 09/703,494, entitled "Electronic Pen with Ink On/ink off Function and Paper Touch Sensing"; U.S. patent application Ser. No. 09/703,480, entitled "Method and System for Handling FIFO and Position Data in Connection with an Electronic Reading Device"; U.S. patent application Ser. No. 09/703,479, entitled "Hyperlink Applications for an Electronic Reading Device"; U.S. patent application Ser. No. 09/703,464, entitled "Measuring Applications for an Electronic Reading Device"; U.S. patent application Ser. No. 09/703,321, entitled "Method and System for Controlling an Electronic Utility Device Using an Electronic Reading Device"; and U.S. patent application Ser. No. 09/703,481, entitled "Positioning Applications for an Electronic Reading Device"; and U.S. patent application No. 09/703,326, entitled "Method for Sharing Information Between Electronic Reading Devices"; and in U.S. Provisional patent application Ser. No. 60/244,775, entitled "Electronic Pen for E-Commerce Implementations"; and U.S. Provisional Patent Application Ser. No. 60/244,803, entitled "Electronic Pen Help Feedback and Information Retrieval"; all filed concurrently herewith.

BACKGROUND OF THE INVENTION

1. Technical Field of the Invention

The present invention relates.in general to the communications field, and in particular to an interaction of an electronic reading.device with an address pattern.

2. Description of Related Art

Numerous devices exist for accepting user input and controlling user interaction with desktop and portable computers, personal digital assistance (PDAs), mobile phones, and other types of electronic devices. For example, a keyboard can be used to accept typed input and other types of commands, a mouse or a track-ball can be used to provide relative motion input as well as various types of point-and-click selections, a keypad can be used to provide input of numerical data and functional commands, navigational keys can be used for scrolling lists or otherwise repositioning a cursor, and various types of touchpads or touchscreens can be used to provide absolute positional coordinate inputs. Each type of mechanism for accepting input and for supporting user interaction has benefits and disadvantages in terms of size, convenience, flexibility, responsiveness, and easy of use. Generally, the selection of a particular type of input mechanism is dependent upon the function of the application and the degree and type of interaction required.

With the ever expanding capabilities and availability of applications both on the Internet and the area of wireless technology, there continues to be a need to develop and provide new mechanisms for accepting input and interacting with users. In particular, some of the existing technologies suffer from drawbacks or limitations, such as size and flexibility, that make them impractical and/or inconvenient to use in some situations. By expanding the range of mechanisms for supporting user interaction, application developers and end-users can have greater flexibility in the selection of input devices. Preferably, any such new mechanisms will provide increased flexibility and will maximize user convenience. In addition, the development of new mechanisms for interacting with users can expand the realm of potential applications.

For example, while a keyboard typically provides a great deal of flexibility, particularly when it is used in connection with a mouse, a touchscreen, or other navigational device, its size makes it inconvenient in many cases, especially in the wireless context.

SUMMARY OF THE INVENTION

The present invention comprises a method and system for operating an electronic reading device based user interface. The electronic reading device detects portions of an address pattern for use in identifying successive positions of the electronic reading device relative to the address pattern. Initially, data identifying a detected portion of the address pattern is sent to a client device. The client device uses the received data to locate an address of an application server that contains an application description for an area of the address pattern that includes the detected portion. A request for the application description is then sent to the application server, which responds by retrieving the application description and forwarding it to the client device. The client device uses the application description for processing subsequently detected successive positions on the address pattern.

In another aspect of the invention, the electronic reading device includes a sensor for detecting portions of the address pattern and a position buffer for storing data identifying the detected portions of the address pattern. A memory stores a grid description of a current address pattern area. Preferably, the grid description is included in the application description and is forwarded to the electronic reading device when the application description is received by the client device. A processor in the electronic reading device, using the grid description, determines a position for each successive portion of the address pattern stored in the position buffer. The positions are then used to generate strokes, which are further processed to initiate actions corresponding to the generated strokes. These actions can be sent to the client device for further processing in accordance with the current application description.

In yet another aspect of the invention, the system also includes a name server for use in identifying an address of an application server associated with a detected position, a base translator for performing generic translations of information entered with the electronic reading device, and a control node for processing detected positions in a standardized way and/or for use in real-time control applications.

In another aspect of the invention, the electronic reading device can be used in connection with a separate electronic device for configuring the electronic reading device or for interacting with an application. For instance, configuration data for the electronic reading device can be sent to the separate electronic device, and an MMI for the separate electronic device can be used to select desired options in the configuration data. Similarly, when the electronic reading device detects a portion of an address pattern associated with a particular application, application data can be sent to the separate electronic device where the data is displayed on a display screen. The user can then make a selection relating to the application either using an MMI for the separate electronic device or by using the electronic reading device on an appropriate field on the address pattern.

BRIEF DESCRIPTION OF THE DRAWINGS

For a more complete understanding of the present invention, reference is made to the following detailed description taken in conjunction with the accompanying drawings wherein:

FIG. 16 is a message flow signaling diagram for providing application interaction using AT commands to create dynamic menus.

DETAILED DESCRIPTION OF THE INVENTION

The present invention relates to a system in which an electronic reading device, such as:an electronic pen, an electronic mouse, or a hand scanner, works in cooperation with an address pattern (e.g., a specially formatted paper) to provide for a detection of a location of the electronic reading device;over the address pattern. For instance, a pattern of dots can be defined such that, by examining a very small portion of the pattern, a precise location in the overall pattern can be determined. In fact, it is possible to define a pattern that has the size of 73,000,000,000,000 A4 pages, which is equivalent to half the size of the entire United States Portions of the pattern can be placed on sheets of paper or other objects.

Then, using an electronic scanner pen that can detect the dots in the pattern, it is possible to detect the location of the pen with respect to the unique pattern. For example, when such a pen is used in connection with a specially formatted paper, the pen can detect its position (e.g., using a built in camera) by detecting a 3 mm by 3 mm portion of the pattern. By taking approximately 100 pictures per second, the pen is capable of determining its exact position to within 0.1 mm or less. This system can be used to provide user input, to facilitate user interaction, or to store handwritten notes or drawings. Moreover, by associating portions of the overall pattern with certain applications, such a system can be used to interact with wide variety of applications.

Figure 1:
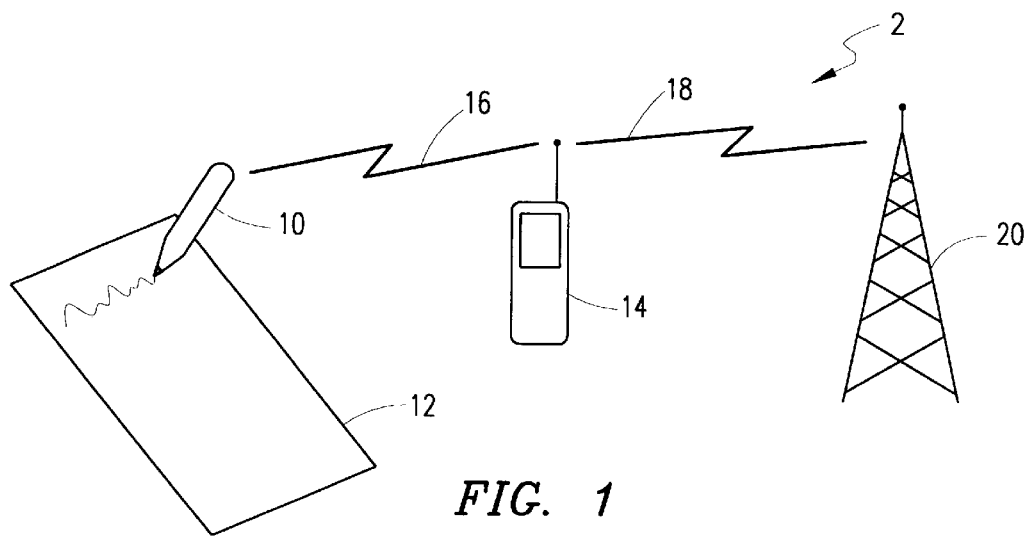
FIG. 1 is a block diagram of a system in which an electronic pen can be used as an input device.

Referring now to FIG. 1, there is illustrated an example of a system 2 in which an electronic pen 10 can be used as an input device. The electronic pen 10 includes an ink cartridge and is capable of writing in a typical fashion. The electronic pen 10, however, includes some type of sensor (e.g., a built-in camera) that is used for detecting an address pattern on a specially formatted piece of paper 12. In particular, the paper 12 is formatted with a small portion of a large address pattern such that when the electronic pen 10 is used to write on or otherwise make marks on the paper 12, the writings or markings can be electronically detected and stored.

As an example, the paper 12 might constitute a form that can be used for sending an email. Thus, the paper 12 might include a space for writing in the email address of an intended recipient, a space for writing a subject of the email, and a space for writing the body of the email. As the electronic pen 10 is used to fill in each of the spaces, the position and movement of the electronic pen 10 on the paper 12 can be determined by repeatedly detecting the current x, y coordinates of the pen 10 (e.g., at rate of 100 frames per second). The markings can then be converted into ASCII text using an appropriate handwriting recognition program. Once the user completes the form, the email can be sent, for example, by checking a send box at a predetermined location on the paper 12.

Preferably, the coordinate information collected by the pen 10 is sent by a short range radio transmitter in the electronic pen 10 to a nearby mobile station 14 using a short range radio interface 16 such as a local wireless radio link (e.g., a local wireless radio link supported by Ericsson's Bluetooth™ wireless communications technology). Alternatively, instead of using a mobile station 14, the coordinate information could also be sent to, for instance, a desktop or portable computer, a personal digital assistant (PDA), a television, or a Bluetooth terminal. Moreover, instead of using a local wireless radio link, other types of local wireless links, such as inductive coupling and infrared light; other types of radio links, such as Global System for Mobile Communication (GSM); or wired transmission media, such as a cable can also be used. The information can then be forwarded via an appropriate link, such as a cellular air interface 18, to a base station 20 or other network node.

Figure 2:
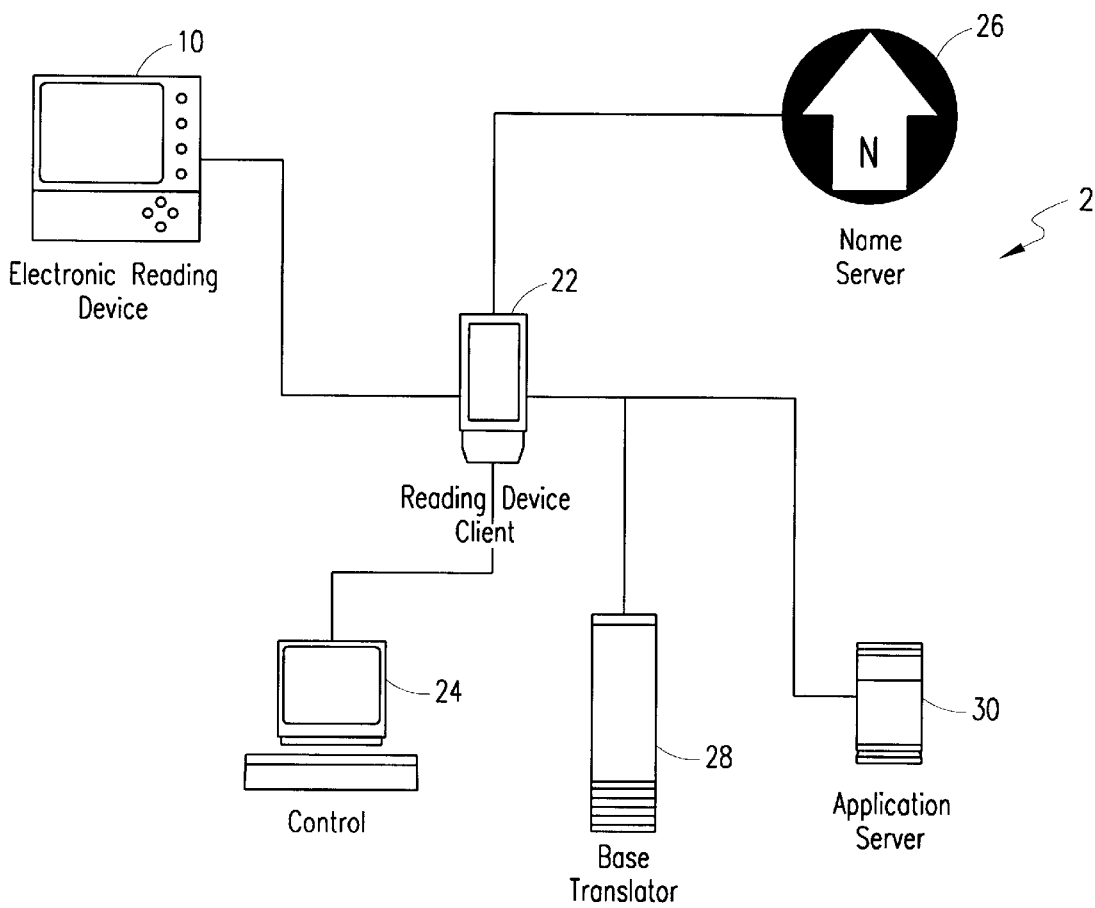
FIG. 2 is a schematic diagram of a system for supporting use of the electronic pen described in connection with FIG. 1.

Referring now to FIG. 2, there is illustrated a schematic diagram of a system 2 for supporting use of the electronic pen 10 described in connection with FIG. 1. Throughout the subsequent discussion, the system 2 is described primarily in connection with an electronic pen 10. It will be understood, however, that the invention and the underlying system 2 can instead use any type of electronic reading device, such as an electronic pen, an electronic mouse, or a hand scanner. As shown in FIG. 2, the system 2 includes six different entities, including the electronic pen 10, electronic pen client 22, a control node 24, a name server 26, a base translator 28, and an application server 30. Although these various devices are described and depicted separately, it is also possible to combine two or more of the entities into the same device (e.g., the electronic pen 10 and electronic pen client 22 can be contained in the same device).

The electronic pen 10 is responsible for detecting positions on the address pattern, producing actions, and sending information to the electronic pen client 22. In addition to being able to leave pen markings, some electronic pens can also have the ability to produce other types of output, such as sound, vibration, or flashing lights. The electronic pen 10 includes a memory for storing a current grid, which comprises information relating to an area of the address pattern that is near the most recently detected position of the electronic pen 10. When the electronic pen 10 is loaded with the current grid, it knows what actions to take based on the positions that are read from the address pattern. When the electronic pen 10 is first turned on or when it moves to an area outside of the current grid, the electronic pen 10 must first request a new grid description before it can continue processing information. In such a situation, the electronic pen 10 requests a new grid description from the electronic pen client 22.

The electronic pen client 22 can be located in the electronic pen 10, in a PDA, in a mobile station 14, in a desktop or portable computer, in the electronic pen 10 itself, in a server somewhere on the Internet, or in another device. The electronic pen client 22 comprises a processor that serves as the center of communications in the overall system 2. For instance, the electronic pen client 22 can comprise a wireless application protocol (WAP) client or web client that is modified to support pattern-based user interfaces. In particular, the electronic pen client 22 receives new grid requests and action requests from the electronic pen 10 and responds to these requests by contacting an appropriate entity within the overall system 2 to properly respond to the request from the electronic pen 10. Furthermore, when the electronic pen 10 is being used in connection with a particular application, the electronic pen client 22 can store the application and/or any corresponding data received from the electronic pen 10 to facilitate processing and use of the application. The client functionality could be downloaded dynamically into a mobile phone, electronic reading device, PC, or other electronic device each time an application is accessed or when an application is first used. The downloaded client functionality could be in the form of, for example, a Java applet, a Jini application, or some other similar format.

The name server 26 is used for translating a detected position on the address pattern into a Uniform Resource Location (URL) associated with that position. Different portions of the address pattern are assigned to different applications. Neither the electronic pen 10 nor the electronic pen client 22, however, is aware of all of the different applications and the particular areas assigned to each application. Thus, when the electronic pen 10 detects a new or unknown position, it forwards the position information to the electronic pen client 22, which in turn sends the information to the name server 26. The name server 26 then identifies an application associated with the received position and retrieves a URL where a description of the particular application can be found. The retrieved URL can then be used by the electronic pen client 22 to retrieve the application description.

Be As an alternative, the name server 26 can comprise a global name server that keeps track of a location, in the form of URLs to local name servers, where more information can be found about different addresses in the pattern. Similarly, each local name server can use other local name servers to obtain the necessary information, i.e., to convert apposition into a URL where an application description can be found. At the lowest level, the local electronic pen client should know all the paper addresses that are within a specific application or applications.

There are some services that should be available in the overall system 2 for which it is inconvenient or not feasible to support such services in the electronic pen 10 or the electronic pen client 22. In such a case, the base translator 28 can be used to support the services. For example, the base translator 28 might contain handwriting recognition software for converting pen actions into text or for converting pen actions into a predefined set of symbols. When such services are needed, the electronic pen client 22 can send a request to the base translator 28 along with the necessary data, and the base translator 28 can perform the requested service.

Another entity in the system 2 is a control node 24. The control node 24 is used for responding to actions in a standardized way. For example, the control node 24 can be used to respond to certain generic functions, such as "cancel" or "submit" functions, in a consistent manner without regard to the particular application that is currently active.

In addition, the control node 24 is used for creating streaming-like applications. For instance, some applications might require that the positions on the address pattern that are detected by the electronic pen 10 be immediately sent, upon detection, to the electronic pen client 22 for use by the application (i.e., the electronic pen 10 does not wait to transmit the position data until a complete stroke is detected or until a "send" field is touched). One example is an application that is used to control an industrial robot in a warehouse. In such a case, the application description that is loaded onto the electronic pen server 22 can include instructions that all positions be streamed to a control node 24. As a result, the control node 24 can receive the positions in real time and can control the robot without waiting for the form (i.e., the current grid) to be completed. Thus, the control node 24 can perform a real-time translation from detected positions to a responsive action, such as moving an object (e.g., a robot, a valve, etc.) or controlling a process.

The application server 30 is a regular web or wireless application protocol (WAP) server that supports an application associated with a particular area of the address pattern. The application server 30 can be located in the electronic pen 10, in a mobile station 14, in a desktop or portable computer, on a network server, or in another device. The application server 30 stores an application description and provides the application description to the electronic pen client 22 upon request. In addition, the application server 30 receives input data from the electronic pen 10 via the electronic pen client 22. For example, the application description might define a number of data entry areas on a form. Thus when data is entered on the form by the electronic pen 10, the data is received by the electronic pen client 22, converted into text using handwriting recognition software, and forwarded to the application server 30, which stores the data or otherwise processes the data in accordance with the function of the application.

Figure 3:
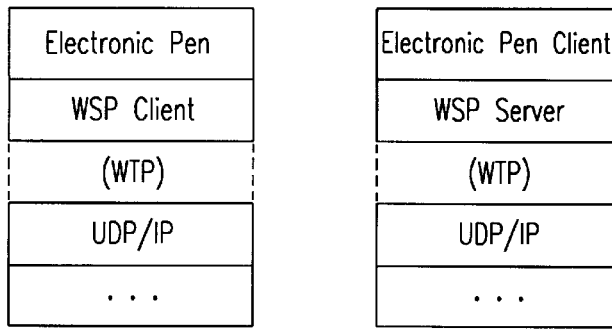
FIG. 3 is an illustration of the protocol stacks that can be used in the case of local communications between an electronic pen and an electronic pen client.
Figure 4:
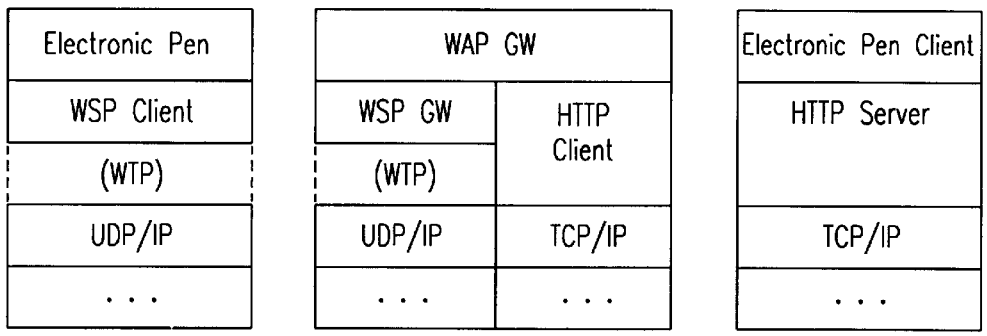
FIG. 4 is an illustration of protocol stacks that can be used when an electronic pen and an electronic pen client communicate with one another via an Internet connection.
Figure 5:
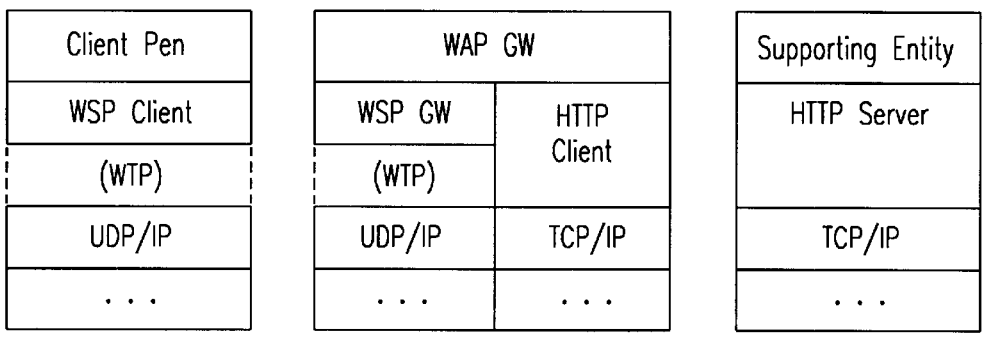
FIG. 5 is an illustration of a protocol stack for communications between an electronic pen client and each of the supporting entities when the electronic pen client is not located within a server on the Internet.
Figure 6:
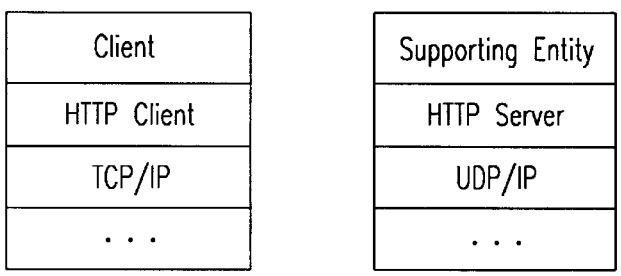
FIG. 6 is an illustration of protocol stacks that are used for communications between an electronic pen client and each of the supporting entities when the electronic pen client is located on the Internet.

Referring now to FIGS. 3 through 6 there are illustrated various examples of protocol stacks that can be used for communicating between the entities shown in FIG. 2. Generally, however, such protocols apply however, only if the two communicating entities are implemented in different devices. If two or more entities are combined into one device, a proprietary protocol can be used to communicate between the entities. FIG. 3 illustrates the protocol stacks that can be used in the case of local communications (e.g., using Bluetooth) between the electronic pen 10 and the electronic pen client 22. If, on the other hand, the electronic pen 10 and the electronic pen client 22 communicate with one another via an Internet connection, the protocol stacks depicted in FIG. 4 will be used FIG. 5 illustrates a protocol stack for communicating between the electronic pen client and each of the supporting entities, such as the name server 26, the control node 24, the base translator 28, and the application server 30, when the electronic pen client 22 is not contained within a server on the Internet (e.g., such as when the electronic pen client 22 is located in a mobile phone 14). Finally, FIG. 6 depicts the protocol stacks that are used when the electronic pen client 22 is located on the Internet.

There are a number of procedures that can be used by the various entities in the system 2 to allow the system to operate properly. When the electronic pen 10 detects a position on the address pattern that is not within its currently loaded grid or when the electronic pen 10 has no currently loaded grid, the electronic pen 10 initiates a new grid procedure. The new grid procedure involves sending a new grid request object to the electronic pen client 22. The new grid request object contains the newly detected position, a description of the actions that the electronic pen 10 can natively support, and a description of the output signals that the electronic pen 10 supports. The reply to a new grid request object is a grid description, which can be provided by the electronic pen client 22 from its own internal memory or from the information provided by an application server 30. Generally, the electronic pen client 22 extracts the grid description from an application description received from the application server 30. The grid description should only contain action-field-types that the electronic pen 10 has indicated that it natively supports, which means that the electronic pen client 22 in some cases should convert the extracted grid description into a format that the electronic pen 10 can understand.

In some situations, it may be necessary for the electronic pen 10 to unload its current grid at the request of the electronic pen client 22. In such a case, the electronic pen client 22 sends an empty grid description to the electronic pen 10, thereby causing the electronic pen 10 to unload its current grid. This can occur, for example, when a particular application is complete or when a new grid description request received from the electronic pen 10 cannot be fulfilled, such as when the position received from the electronic pen 10 is not registered in the name server 26.

Another similar message is the empty grid description with a grid exception. When the electronic pen 10 requests a new grid description from the electronic pen client 22, the electronic pen client 22 uses the detected position specified in the request to ask the name server 26 for a URL where the application description can be found. If no URL is returned, the electronic pen client 22 can send an empty grid description with a grid exception to the electronic pen 10. The grid exception comprises a rectangle or other shape indicating the area around the detected position where no registered applications can be found. Preferably, the indicated area is as large as possible so that the electronic pen 10 and/or electronic pen client 22 know the extent of the surrounding area that is unassigned and do not have to repeatedly send requests to the name server 26. Thus, the empty grid description with a grid exception causes the electronic pen 10 to unload its current grid and also informs the electronic pen 10 of an area surrounding the detected position that can essentially be ignored because its is not associated with any application.

The procedure that is used when the electronic pen 10 detects a new position is a find application description location procedure. This procedure is used by the electronic pen client 22 to translate a detected position received from the electronic pen 10 into a URL where a description of an application corresponding to that position can be found. The procedure involves sending a request from the electronic pen client 22 to the name server 26 containing identification of the detected position. The name server 26 responds by sending a reply to the electronic pen client 22 containing a URL where an application description can be found or, if the detected position is not registered in the name server 26, containing an indication that no associated application is known to exist.

Once the electronic pen client 22 knows the URL where an application description can be found, the electronic pen client 22 can initiate a get application description procedure, which allows the electronic pen client 22 to retrieve the application description from the application server 30. In particular, the electronic pen client 22 sends an application description request containing a unique ID for the requesting electronic pen 10 and/or electronic pen client 22 to the application server 30 located at the URL address provided by the name server 26. In response, the application server 30 provides an application description object to the electronic pen client 22, which loads the application onto the electronic pen client 22. The application description object is similar to an HTML form with some additions and modifications.

Furthermore, the application description object can be sent from the application server 30 to the electronic pen client 22 in response to a submitted form (i.e., a submission of one completed form might automatically result in a new form being loaded onto the electronic pen client 22). A related procedure is the application submit procedure, which is used by the electronic pen client 22 when the user of the electronic pen 10 selects a "submit" field in a form. In response to the selection of the "submit" field, the electronic pen client 22 will submit the form content in accordance with instructions received in the application description. Typically, the electronic pen client 22 will submit the form content, in the same way as a regular web browser, to a URL specified in a form tag of the application description.

When an action that can be handled by the electronic pen 10 itself is generated, an action procedure is initiated by the electronic pen 10 to send an action request object to the electronic pen client 22. If the electronic pen client 22 cannot translate the action into a field value itself, the electronic pen client 22 further forwards the request to a base translator 28 for translating the action into a field value. In response to the action request object, an action reply object is sent from the electronic pen client 22 to the electronic pen 10. The action reply object contains output information that indicates to the electronic pen 10 which outputs signals to use. The output information, however, cannot be of type that the electronic pen in has previously indicated that it does not support. In some instances, the action reply object might contain a new grid description. In such a case the electronic pen 10 will unload its current grid description and load the new grid description. Similarly, if the action reply object contains an empty grid description, the electronic pen 10 will simply unload its current grid description.

The action request object is also sometimes used to specify actions that should be processed by the control node 24. In this instance, the electronic pen client 22 initiates a control procedure by forwarding the received action to the appropriate control node 24. As a result, the control node 24 sends an action reply object to the electronic pen client 22.

The operation of the electronic pen 10 will now be discussed in greater detail. Each electronic pen 10 has a unique pen ID, which is sent to the application server 30 when an application description is requested. The electronic pen ID allows the application to identify the particular user that is using the application and to distinguish between multiple concurrent users of the same application, such as when different electronic pens 10 are being used in connection with separate sheets of paper that each contain the same portion of the address-pattern.

Figure 7:
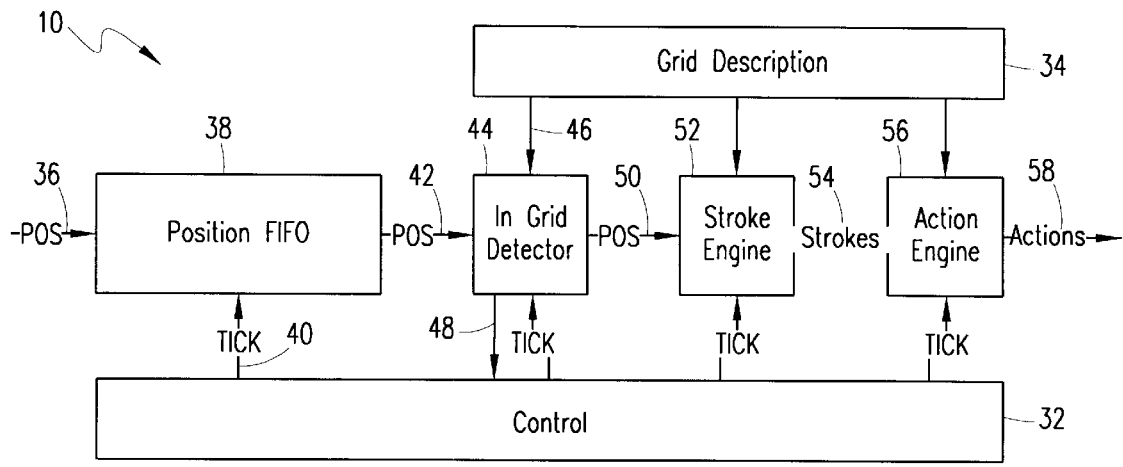
FIG. 7 is a block diagram of the electronic pen logic that handles positions, strokes, actions, and grid descriptions.

Referring now to FIG. 7, there is illustrated a block diagram of the electronic pen logic that handles positions, strokes, actions, and grid descriptions for the electronic pen 10. The electronic pen 10 includes a control block 32 for controlling the operation of the electronic pen 10. A grid description block 34 represents a memory location that stores a current grid description. At any given time, the electronic pen 10 can be in either of two modes. In a first mode, a grid description is loaded, while in a second mode, the grid description block 34 is not loaded with a current grid description.

As the electronic pen 10 moves across an address pattern, the electronic pen 10 periodically (e.g., every $\frac{1}{100}$ of a second) detects a position by detecting all of the dots within, for example, a 3 mm by 3 mm area. Each detected position is forwarded (as indicated at 36) to a position first in first out (FIFO) block 38, which acts as a buffer for temporarily storing the detected positions. The clocking of the position FIFO block 38 is controlled by the control block 32 (as indicated at 40).

The detected position is fed from the position FIFO block 38 (as indicated at 42) to an in grid detector 44. The in grid detector 44 retrieves data from the grid description block 34 (as indicated at 46) and determines whether the received position is within the loaded grid description. If not, the in grid detector 44 notifies the control block 32, which in turn initiates a request for a new grid. When the detected position is within the current grid, the position is then sent (as indicated at 50) from the in grid detector 44 to a stroke engine 52. The stroke engine 52 converts the received positions into strokes, which are then sent (as indicated at 54) to an action engine 56. A complete stroke is created when the electronic pen 10 is lifted from the paper or when it moves outside of the grid field where the stroke began. Finally, the action engine 56 converts the received stroke into an action that can be sent to the electronic pen client 22. By using grid action-field-types, the action engine knows which type of action to produce for a specific grid field.

Figure 8:
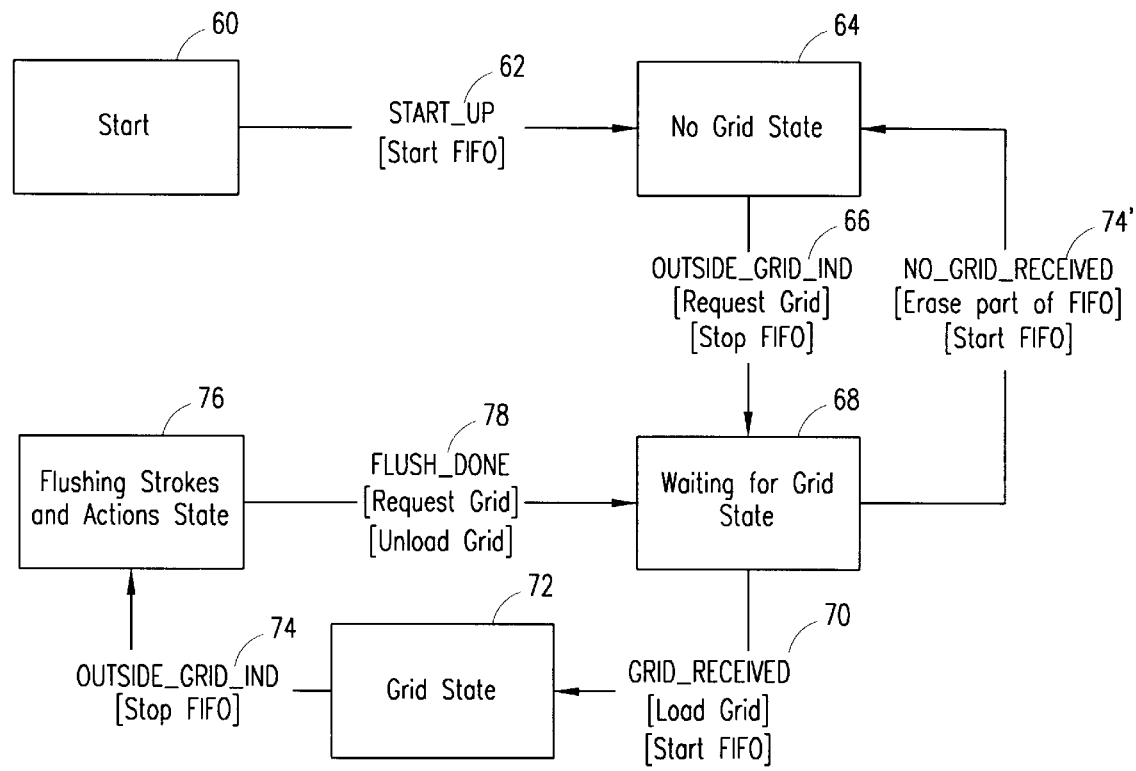
FIG. 8 is a block diagram of a state machine for the electronic pen control block shown in FIG. 7.

Referring now to FIG. 8, there is illustrated a block diagram of a state machine for the control block 32 shown in FIG. 7. In this figure, events are indicated in capital letters, while tasks associated with the event are depicted in brackets. The process starts at step 60 with a start up event 62, which causes the position FIFO block 38 to begin receiving detected positions. Initially, the electronic pen 10 is in a no grid loaded state 64, which means that the electronic pen 10 does not have a grid loaded in the grid description block 34. As a result, the control block 32 generates an outside grid indication 66, thereby causing the electronic pen 10 to send the request for a new grid description to the electronic pen client 22 (i.e., in accordance with the new grid procedure) and to stop the FIFO buffer 38. At this point, the electronic pen 10 enters a waiting for grid state 68.

Once the new grid has been received (as indicated at 70), the control block 32 moves to a grid loaded state 72, at which time the new grid is loaded into the grid description block 34 and the position FIFO block 38 resumes operation. On the other hand, if no grid is received (as indicated at 74'), at least a portion of the positions stored in the FIFO buffer 38 are erased. Which part of the FIFO buffer to erase is determined by the grid exception area, if any, in the received empty grid description. Accordingly, all positions stored in the FIFO buffer 38 that are within the grid exception area should be erased. If no grid exception is received, the stroke associated with the position is erased. In addition, the FIFO block 38 resumes operation and the control block 32 moves into the no grid loaded state 64.

When the control block 32 is in the grid loaded state 72, a current grid is loaded in the grid description block 34. While the control block 32 remains in this state 72, the position FIFO block 38 continues to receive detected positions and passes them on to the stroke engine 52 and action engine 56. Actions produced by the action engine 56 are sent (as indicated at 58) to the electronic pen client 22 (i.e., in accordance with the action procedure described above).

At some point, an outside grid indication 74 may be received by the control block 32 from the in grid detector 44. The outside grid event 74 causes the FIFO block 38 to stop generating new positions. In addition, the electronic pen 10 enters a flushing stroke and action state 76 wherein the strokes that are currently in the stroke engine 52 and the actions that are currently in the action engine 56 are flushed to the electronic pen client 22. Once the stroke engine 52 and action engine 56 have been fully flushed (as indicated at 78), the electronic pen 10 sends a request for a new grid to the electronic pen client 22 and unloads the current grid. The control block 32 then moves back into the waiting for grid state 68.

As a general matter, the electronic pen 10 may be capable of supporting various different types of output, including audio, such as warning tones; visual, such as a flashing light; tactile, such as vibration; and/or ink. In some cases, it might be desirable to allow the user of the electronic pen 10 to turn off the ink of the pen 10, such as when the electronic pen is being used on a portion of the address pattern that is public or shared or when the user wants to be able to reuse the current sheet of paper.

The electronic pen client 22 will now be described in greater detail. Generally, the electronic pen client 22 is analogous to a regular web browser. It is responsible for loading applications from application servers 30 and for handling input form the electronic pen 10. Preferably, the electronic pen client 22 is located in a separate device from the electronic pen 10 itself. This is because it is desirable to minimize the size and power supply requirements of the electronic pen 10, which will likely be adversely affected by the processing resources and memory necessary to support the functions of the electronic pen client 22.

Figure 9:
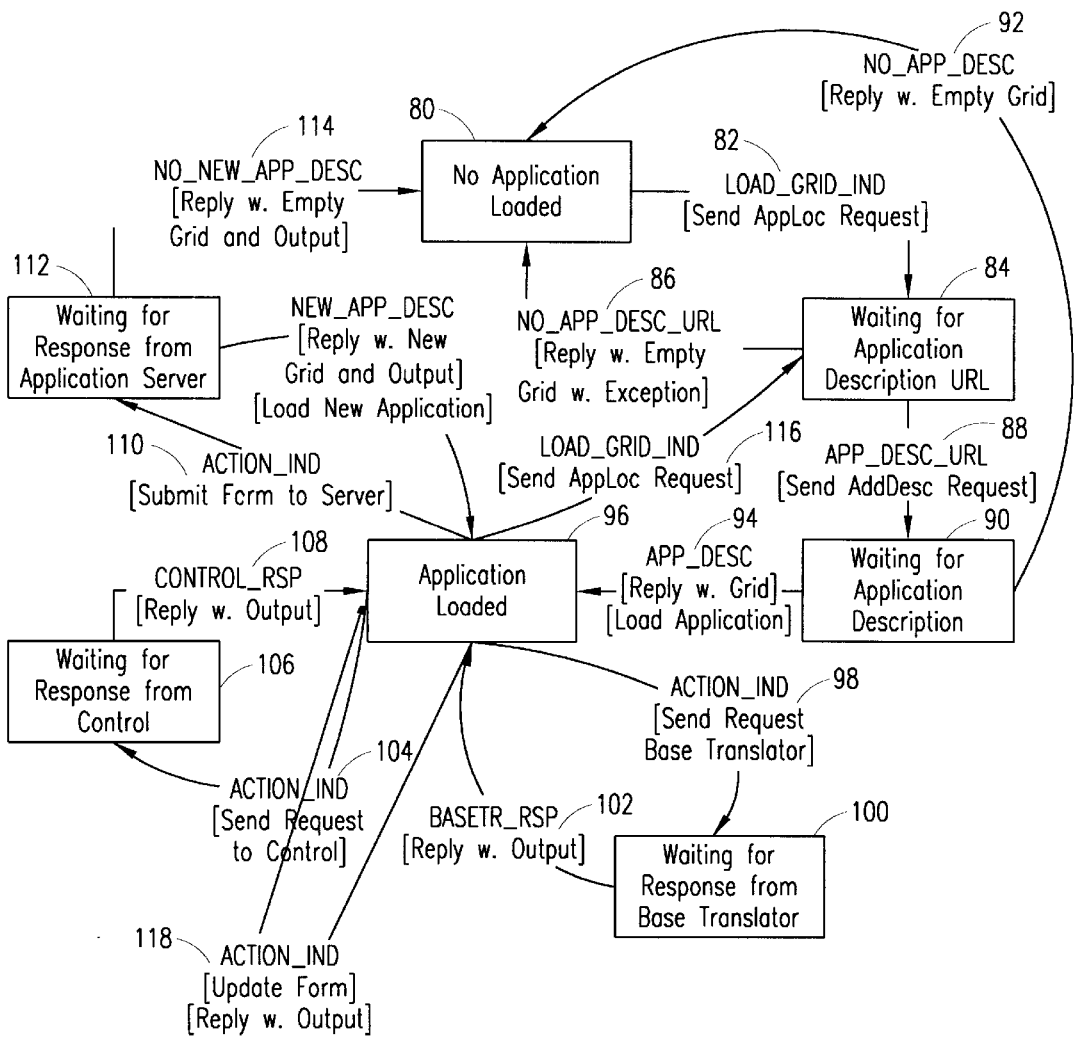
FIG. 9 is a block diagram of a state machine for an electronic pen client.

Referring now to FIG. 9, there is illustrated a block diagram of a state machine for the electronic pen client 22. Initially, the electronic pen client 22 is in a no application loaded state 80. The electronic pen client 22 recognizes only one signal when in this state 80, namely a new grid request from the electronic pen 10. Such a request causes a load grid indication event 82. The electronic pen client 22 responds by sending a request to the name server 26 to translate a position contained within the new grid request into a URL where the application description can be found (i.e., in accordance with the find application location procedure). Next, the electronic pen client 22 enters a waiting for application description URL state 84. If no URL for the application description can be found (as indicated at 86), the electronic pen client 22 sends a new grid reply to the electronic pen 10, wherein the reply contains an empty grid description with a grid exception. As a result, the electronic pen client 22 returns to the no application loaded state 80.

If a URL for the application description is received from the name server 26 (as indicated at 88), the electronic pen client 22 sends a request to the application server 30 to retrieve the application description (i.e., in accordance with the get application description procedure). Accordingly, the electronic pen client 22 enters a waiting for application description state 90.

If the electronic pen client 22 does not receive an application description from the application server 30 (as indicated at 92), a new grid reply is sent by the electronic pen client 22 to the electronic pen 10 wherein the reply contains an empty grid. Thus, the electronic pen client 22 returns to the no application loaded state 80. If, however, the electronic pen client 22 does receive an application description from the application server 30 (as indicated at 94), the electronic pen client 22 sends a new grid reply to the electronic pen 10 containing a new grid description, and the electronic pen client 22 loads the application in its memory. In addition, the electronic pen client 22 moves into an application loaded state 96.

In the application loaded state 96, five types of actions can be received by the electronic pen client 22 from the electronic pen 10. First, a received action can include a request that the electronic pen client 22 cannot handle itself, in which case the electronic pen client 22 will send the action to the base translator 28 (as indicated at 98). The electronic pen client 22 then moves into a waiting for response from the base translator state 100. Once a base translator response 102 is received by the electronic pen client 22, the electronic pen client 22 updates a current form or other data associated with the currently loaded application and sends an action reply to the electronic pen 10 with appropriate output information.

Another type of action that the electronic pen client 22 can receive from the electronic pen 10 is a request that should be forwarded to a control node 24. In such a case, the action is sent to a control URL specified in the application description (as indicated at 104), and the electronic pen client 22 enters a waiting for response from the control state 106. Once a response is received from the control (as indicated at 108), the electronic pen client 22 sends an action reply to the electronic pen 10 with appropriate output information.

A third type of action is a submit form request, in response to which the electronic pen client 22, will submit the current form to the application server 30 that is identified by the URL in the application description (as indicated at 110). The electronic pen client 22 then enters a waiting for response from the application server state 112. If the application server 30 responds by sending an empty application description to the electronic pen client 22 (as indicated at 114), the current application is unloaded from the electronic pen client 22 and an action reply is sent to the electronic pen 10 with an empty grid. As a result, the electronic pen client 22 returns to the no application loaded state 80. On the other hand, if the application server 30 responds with a non-empty application description, the old application is unloaded from the electronic pen client 22, the new application description is parsed and loaded in the electronic pen client 22, an action reply is sent to the electronic pen 10 with a new grid description and with appropriate output information, and finally the electronic pen client 22 returns to the application loaded state 96.

A fourth type of action that can be received by the electronic pen client 22 from the electronic pen 10 is a request to load a new grid. This action occurs, for example, when a position outside of the current grid is detected by the electronic pen 10. When a new grid request is received, the electronic pen client 22 sends a request to the name server 26 (as indicated at 116) and the electronic pen client 22 returns to the waiting for application description URL state 84.

Finally, a fifth type of action that can be received by the electronic pen client 22 is an action that the electronic pen client 22 can handle itself, in which case the electronic pen client 22 updates the current form and sends an action reply to the electronic pen 10 with appropriate output information (as indicated at 118). The electronic pen client 22 then remains in the application loaded state 96. One type of action that the electronic pen client 22 might be able to handle itself is a local application. For example, the electronic pen client 22 might be capable of performing certain basic functions that are defined by a local application. Thus, when the electronic pen client 22 receives a new grid request, the position associated with the new grid request can be analyzed to determine if it corresponds to a local application. If so, the electronic pen client 22 can load the application description from its local memory, send a new grid description to the electronic pen 10 without having to communicate with the name server 26 or the application server 30.

Another action that might be handled locally by the electronic pen client 22 relates to the selection of fields within a form. When the electronic pen client 22 receives an action, the field that corresponds to that action receives focus. When this occurs, the electronic pen client 22 might display the field's value on its display or output the value by audio. In addition, the electronic pen client 22 might allow the user to edit the value of thee field by means other than the electronic pen 10. Yet another type of action that might be handled by the electronic pen client 22 itself are actions that relate to a clipboard function. When a "copy" field is selected, the value of the field that had focus at the time the copy field was selected is transferred to the clipboard. Similarly, when a "paste" field is selected, the value stored in the clipboard is transferred to the field that had focus at the time the paste field was selected.

Figure 10A:
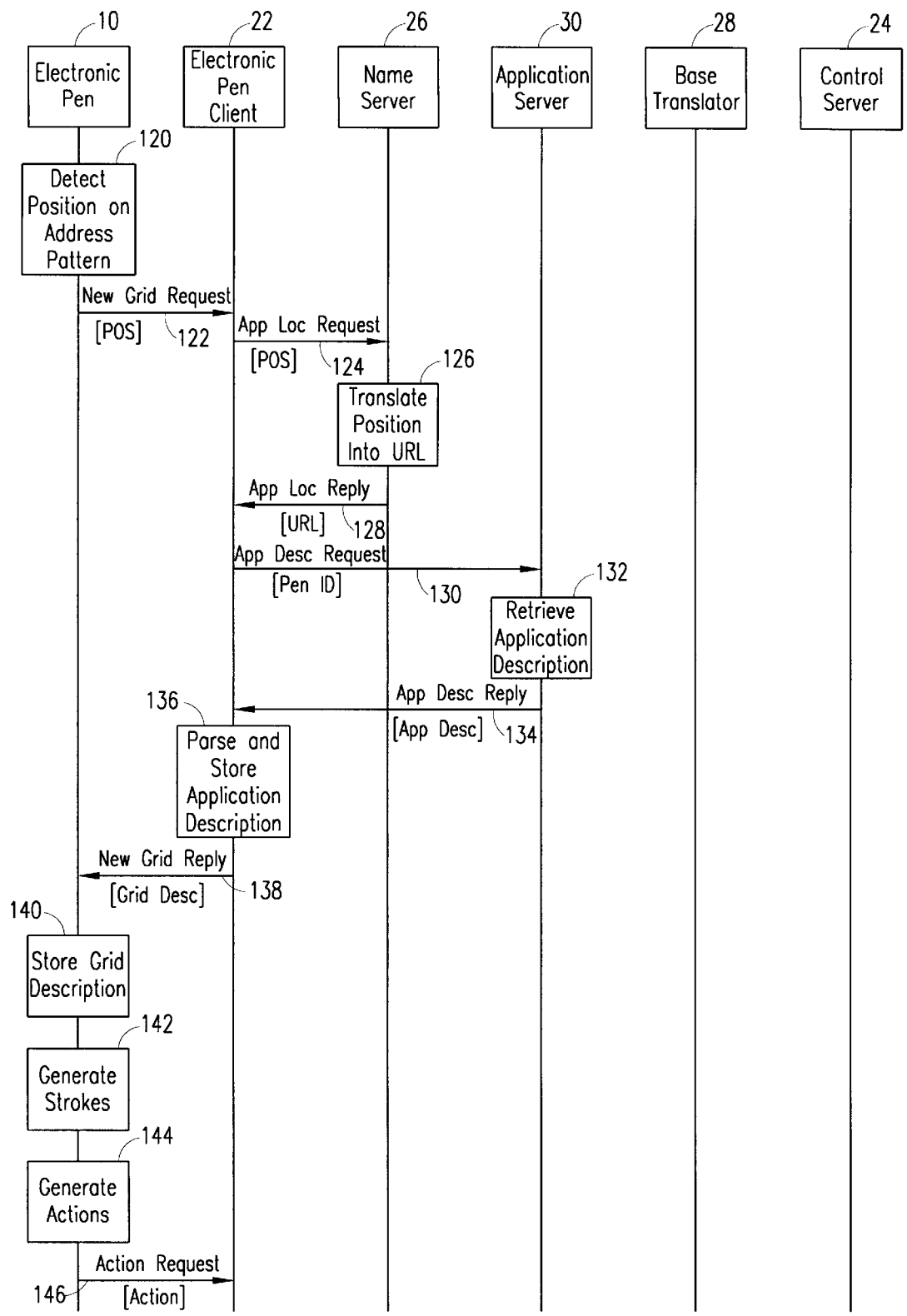
FIGS. 10A–10C are a message flow and signaling diagram illustrating the operation of the electronic pen system shown and discussed in connection with FIG. 2.
Figure 10B:
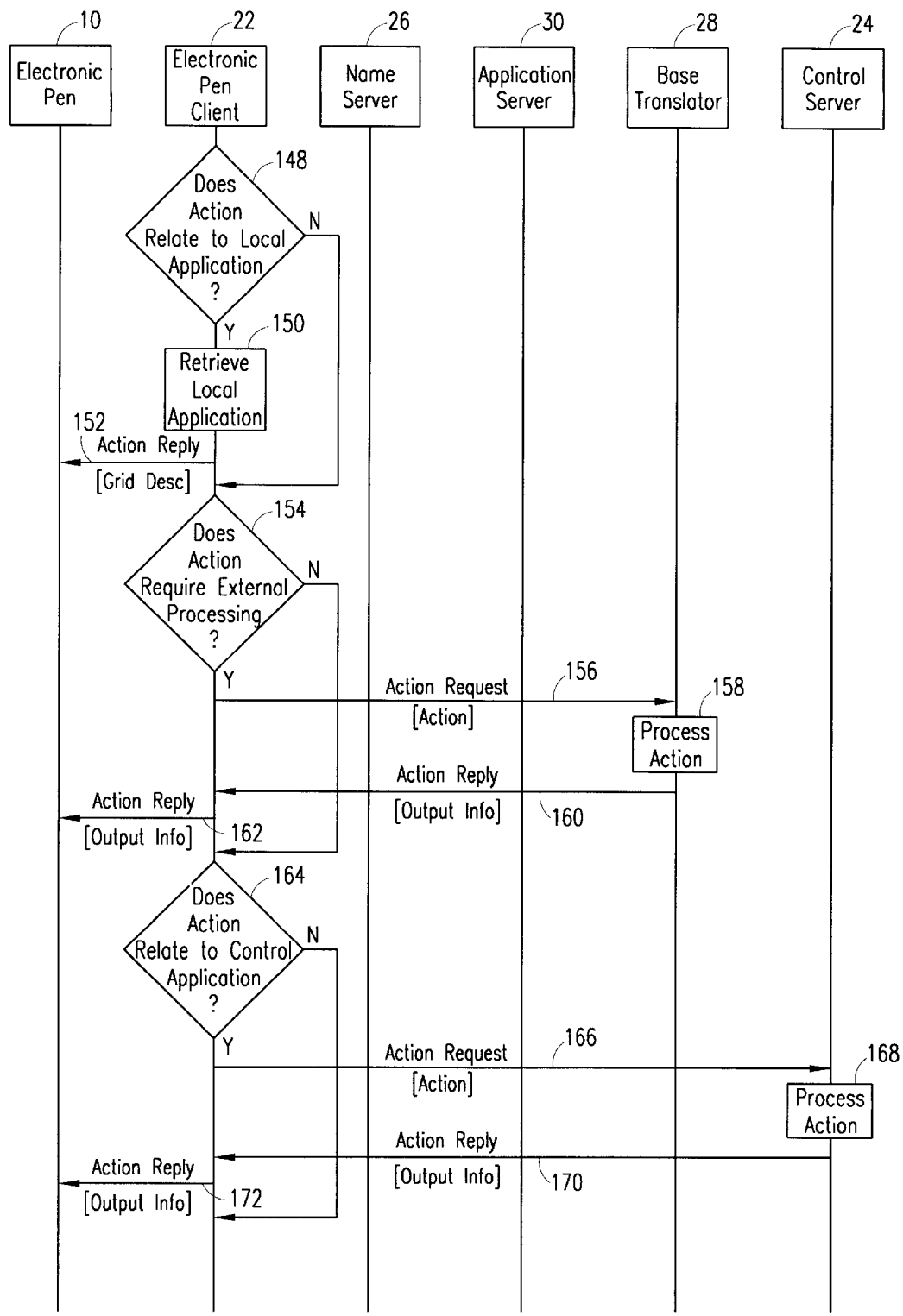
Figure 10C:
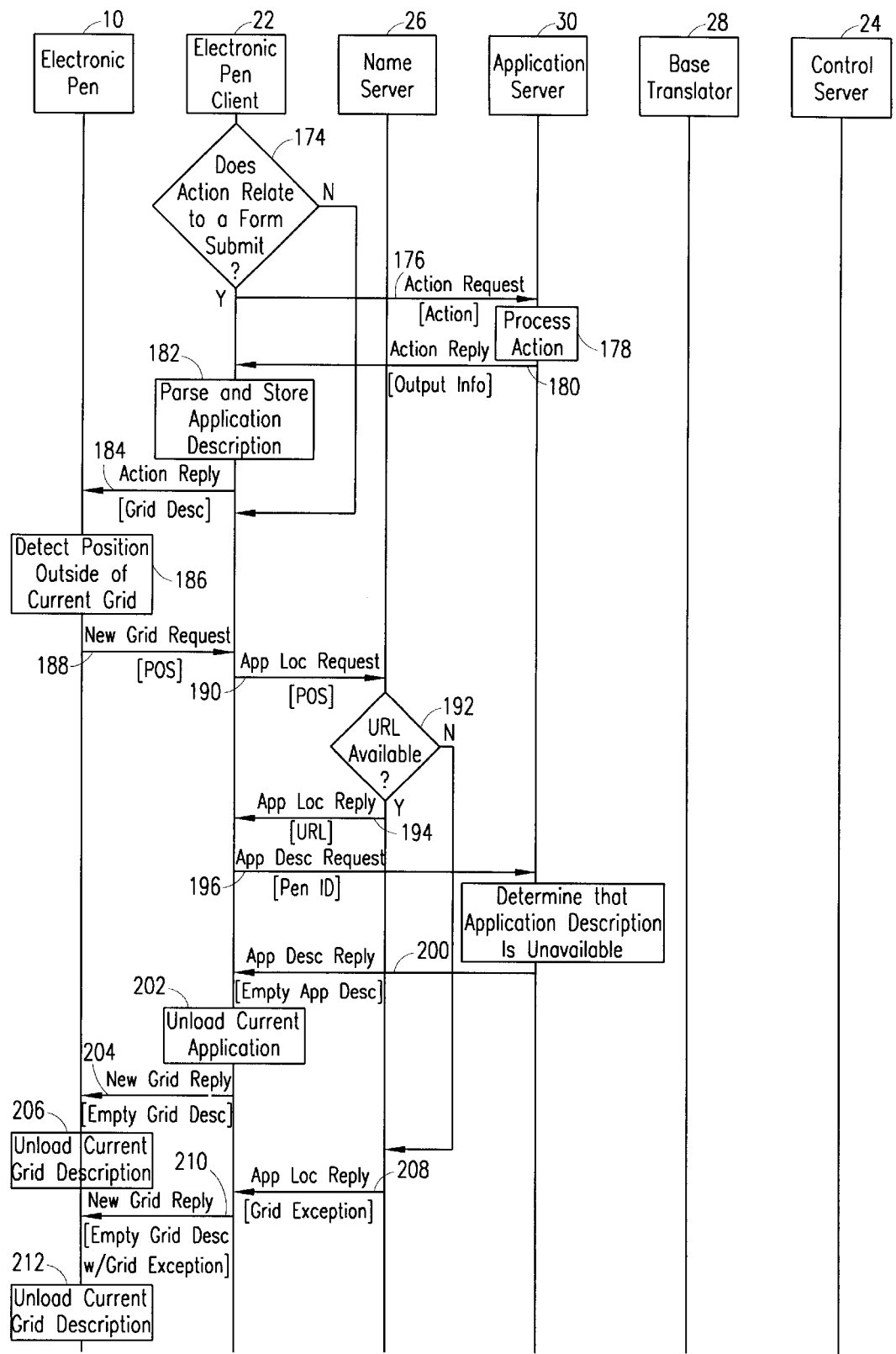

Referring now to FIGS. 10A through 10C, there is shown, by way of example, a message flow and signaling diagram illustrating the operation of the electronic pen system 2 depicted in and discussed in connection with FIG. 2. Initially, the electronic pen 10 detects a first position on the address pattern at step 120 (e.g., at a location on a sheet of paper designated for composing and sending emails). At this stage, it is assumed that the electronic pen 10 is in a no grid loaded state. Thus, in response to the detection of the first position, the electronic pen 10 sends a new grid request 122, which contains the detected position information, to the electronic pen client 22. As a result, the electronic pen client 22 sends an application location request 124 containing the detected position information to the name server 26, at step 126. The name server 26 translates the detected position into a URL where an application description that corresponds to the detected position can be found (e.g., a URL address for a server containing an email application), and returns an application location reply 128 containing the retrieved URL to the electronic pen client 22.

The electronic pen client 22 then sends an application description request 130, which contains the unique pen ID for the electronic pen 10, to the application server 30. The application server 30 retrieves the application description at step 132 and sends an application description reply 134 containing the retrieved application description to the electronic pen client 22. The electronic pen client 22 then parses and stores the application description at step 136. This step further involves generating a current grid description from the application description and sending the grid description to the electronic pen 10 in a new grid reply 138. The electronic pen 10 stores the received grid description at step 140 and resumes processing of the detected positions. Using the detected positions and the information in the grid description (e.g., so that the electronic pen 10 knows which fields of the email form are being filled in), the electronic pen 10 generates strokes at step 142 and generates actions at step 144 using the stroke engine 52 and action engine 56 shown in FIG. 7.

Each time an action is generated that cannot be handled by the electronic pen 10 itself, an action request 146 containing a description of the action is sent from the electronic pen 10 to the electronic pen client 22. At this point, the electronic pen client 22 should determine what type of action has been received so that it can respond to the action in an appropriate manner. First, it is determined whether the action requires the attention of, or otherwise should be processed in accordance with, a local application at step 148. Very basic applications or frequently used applications (e.g., delete entered text), for example, might be stored locally to avoid having to contact another entity. In such a case, the electronic pen client 22 retrieves the local application at step 150 and sends an action reply 152, which can contain a new grid description or other appropriate information.

However, if it is determined at step 148 that the received action does not relate to a local application, the process continues at step 154 where it is determined whether the received action requires processing by an external translator (e.g., handwriting recognition). If so, an action request 156 containing a description of the action is sent by the electronic pen client 22 to the base translator 28. The base translator 28 processes the action at step 158 and sends an action reply 160 containing output information responsive to the received action (e.g., text corresponding to written characters) to the electronic pen client 22, which can forward the output information to the electronic pen 10 in an action reply 162, if necessary.

If it is determined at step 154 that the received action does not require processing by, an external translator, it is next determined whether the action relates to a control application at step 164. If so, an action request 166 containing a description of the action is sent by the electronic pen client 22 to the control server 24. The control server 24 processes the received action at step 168 and, if a response is necessary, returns output information responsive to the received action in an action reply 170, which is forwarded from the electronic pen client 22 to the electronic pen 10 in an action reply 172.

Assuming that it is determined, at step 164 that the received action does not relate to a control function, it is next determined whether the action comprises a request to submit a form at step 174 (e.g., a selection of a "send" area on the email form). If so, an action request 176 containing the data entered onto the form is sent by the electronic pen client 22 to the application server 30. The application server 30 processes the form at step 178 and sends an action reply 180 containing a new application description (or an empty application description) to the electronic pen client 22. The electronic pen client 22 parses and stores the new application description at step 182 and generates a new grid description from the newly received application description. The electronic pen client 22 then sends an action reply 184 containing the new grid description. Although not illustrated in the figure, the electronic pen 10 will typically respond to the receipt of a new grid description by unloading its current grid description and loading the new grid description into its memory.

At some point, it is assumed that the electronic pen 10 detects a position that is outside of the currently loaded grid at step 186. In response to such an event, the electronic pen 10 sends a new grid request 188 containing the newly detected position data to the electronic pen client 22. In response, the electronic pen client 22 again generates an application location request 190 containing the detected position data and sends the request to the name server 26. The name server 26 determines whether a URL for an application description that corresponds to the newly detected position is available at step 192.

If so, the name server 26 sends an application location reply 194 containing a retrieved URL to the electronic pen client 22, which in turn sends an application description request 196 containing the unique pen ID for the electronic pen 10 to the application server 30 at the identified URL address, just as previously discussed in connection with messages 128 and 130. In this case, however, it is assumed that the application server 30 determines that the requested application description is unavailable at step 198. As a result, the application server 30 sends an application description reply to the electronic pen client 22 containing an empty application description. In response to the receipt of an empty application description, the electronic pen client 22 unloads the current application at step 202 and sends a new grid reply 204 containing an empty grid description to the electronic pen 10. The electronic pen 10 responds to the receipt of the empty grid description by unloading the current grid description at step 206.

Another possibility is that the name server 26 determines at step 192 that a URL corresponding to the detected position is not available. In this situation, the name server 26 sends an application location reply 208 to the electronic pen client 22. The reply 208 may simply be empty to indicate that a URL is not available. Preferably, however, the reply 208 contains a grid exception defining the largest area possible around the detected position for which there is no corresponding URL. In response to the reply 208, the electronic pen client 22 sends a new grid reply 210 containing an empty grid description with a grid exception. Upon receiving the reply 210, the electronic pen 10 unloads the current grid description at step 212. Furthermore, assuming that the electronic pen 10 receives and recognizes the grid exception information, the electronic pen 10 may subsequently be able to determine that certain detected positions on the address pattern are not associated with any application without having to send a request to the name server 26 or the application server 30.

In accordance with one embodiment of the invention, an electronic pen 10 or other electronic reading device can be used in connection with a client device 22 that includes an electronic MMI for enhancing interactions involving the electronic pen 10. For example, the client device 22 might comprise a mobile phone. The mobile phone's MMI can be used for accessing and configuring the electronic pen 10. Alternatively, the electronic pen 10 can be used in connection with an addressed surface to provide an input MMI, while the phone MMI can be used to provide output (feedback tithe user) and other types of input.

Figure 11:
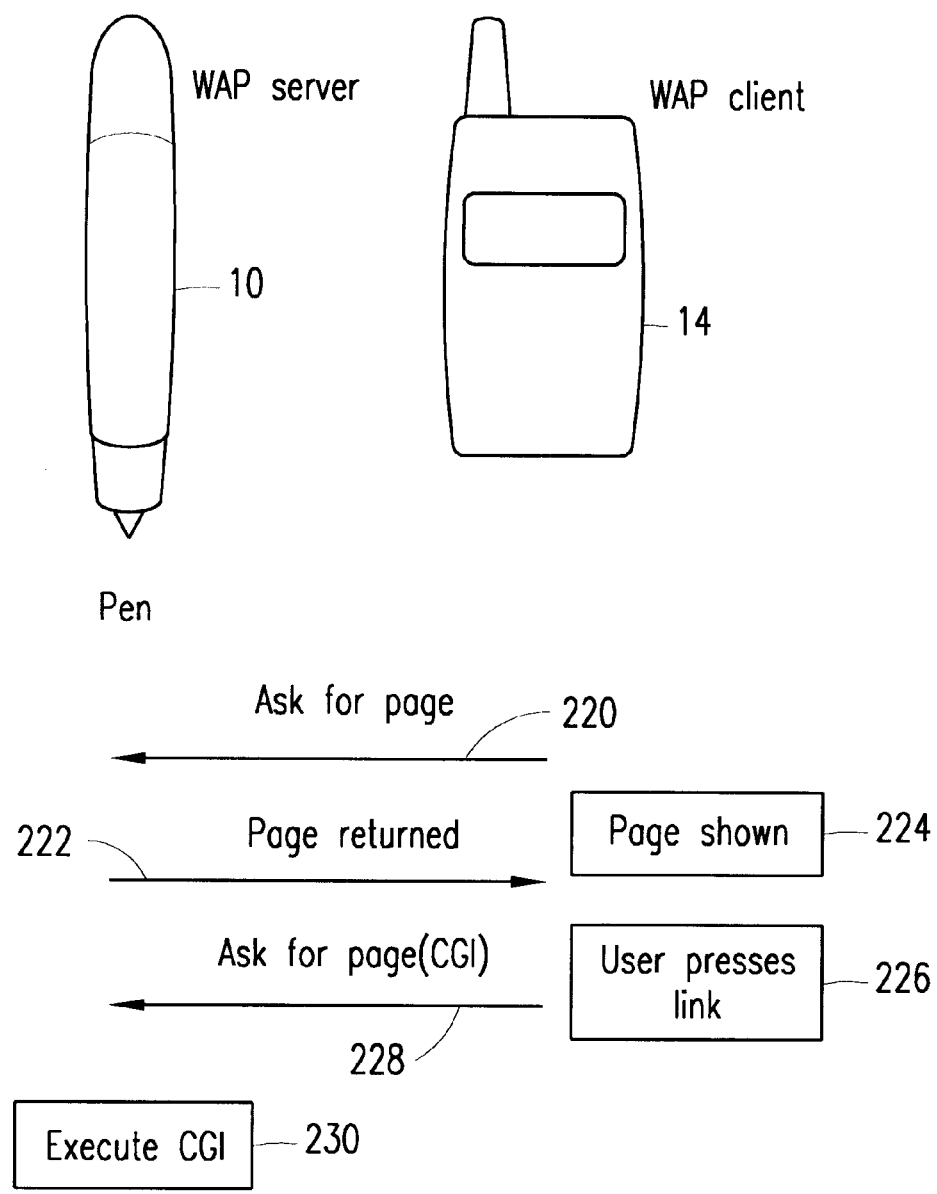
FIG. 11 is a message flow and signaling diagram for configuring an electronic pen using a wireless application protocol (WAP) browser in a mobile phone.

Referring now to FIG. 11, there is illustrated a message flow and signaling diagram for configuring and accessing pages in an electronic pen 10 using a wireless application protocol (WAP) browser in a mobile phone 14 in accordance with one embodiment of the present invention. In this case, the electronic pen 10 contains a WAP server, while the mobile phone 14 includes a WAP client. First, the WAP client in the mobile phone 14 sends a request message 220 to the WAP server in the electronic pen 10 requesting a particular WAP page (e.g., a configuration page). The WAP server responds by returning the requested page in a response message 222. The WAP client then displays the page at step 224 on a mobile phone display screen. At step 226, a user selects a link displayed on the display screen using the mobile phone MMI (e.g., a mobile phone keypad or soft keys). The WAP client sends another request message 228 that contains a common gateway interface (CGI) call to the WAP server, which executes the CGI call at step 230. Thus, the mobile phone 14 can be utilized as an MMI for configuring the electronic pen 10.

Figure 12:
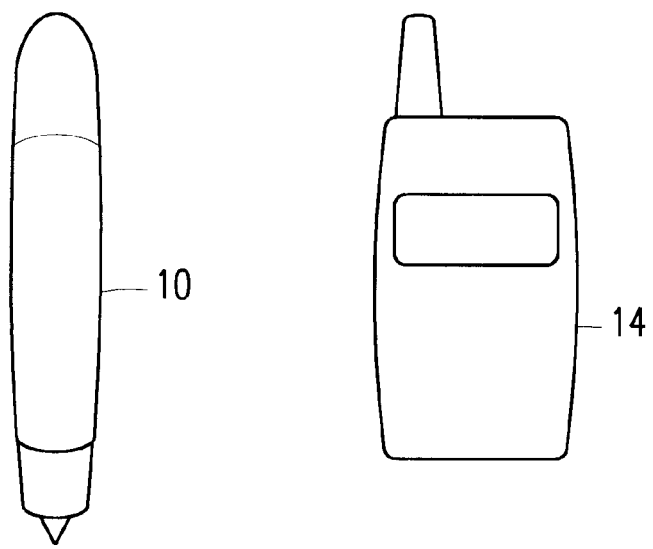
FIG. 12 illustrates a message flow and signaling diagram for configuring an electronic pen using an application program interface (API) for a mobile phone MMI.
Figure 12:
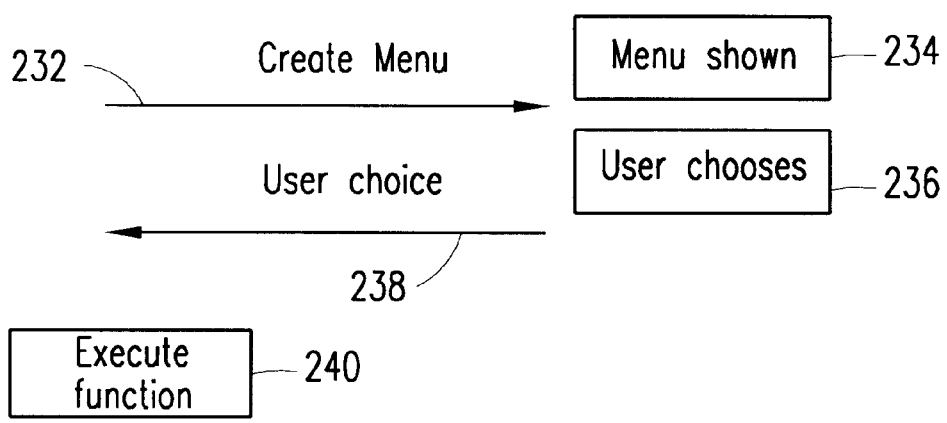

Referring now to FIG. 12, there is illustrated a message flow and signaling diagram for configuring an electronic pen 10 using an application program interface (API) for a mobile phone MMI (e.g., for generating dynamic menus) in accordance with another embodiment of the present invention. Initially, the electronic pen 10 sends a create menu message 232 formatted pursuant to the mobile phone MMI API and containing, for example, menu choices to be displayed. In response to the message 232, the mobile phone 14 displays a menu at step 234. A user then selects a menu option at step 236 using the mobile phone MMI, and the mobile phone 14 sends a user choice message 238 containing an indication of the user selection to the electronic pen 10. In response, the electronic pen 10 executes a function that corresponds to the user selection at step 240.

Figure 13:
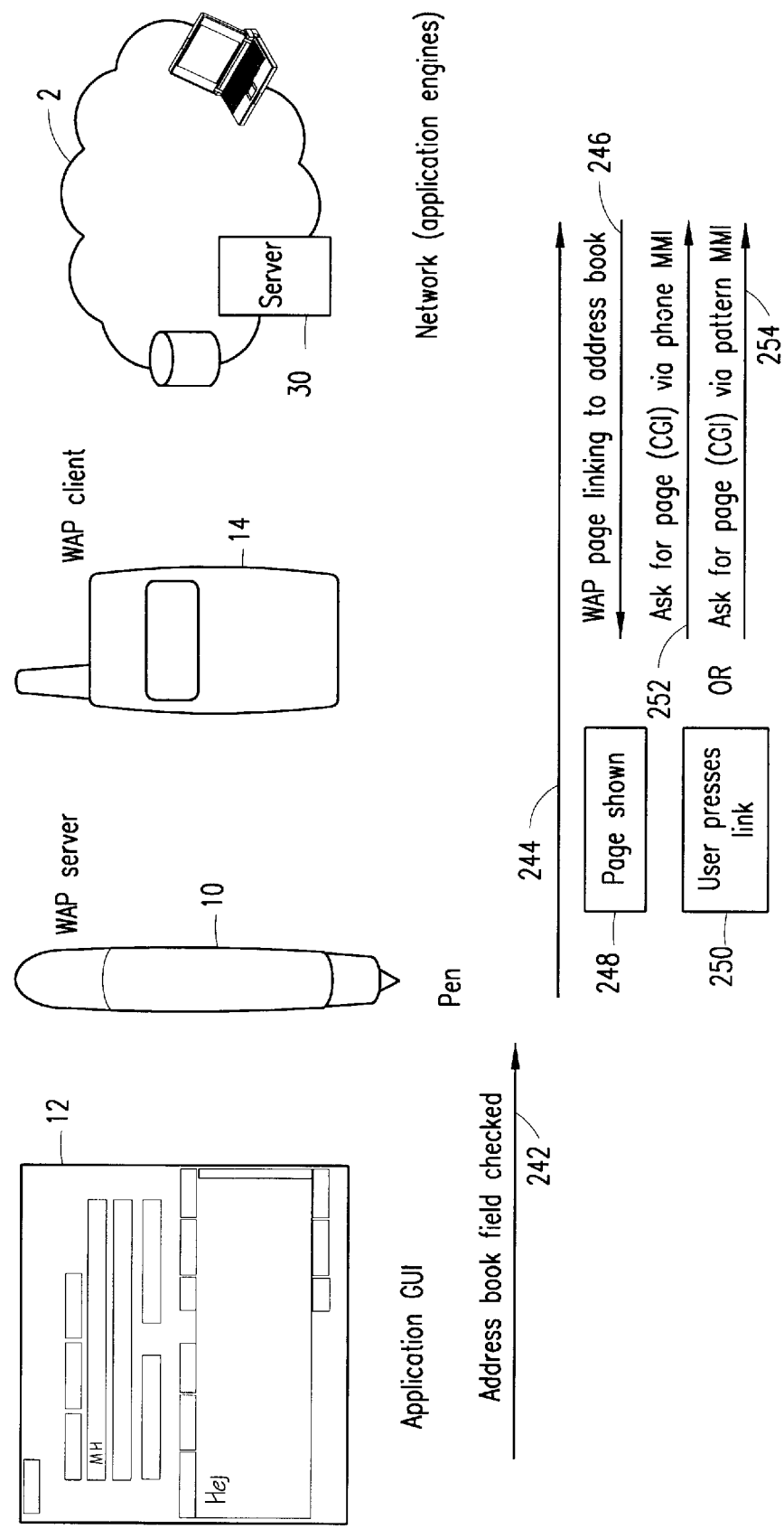
FIG. 13 is a message flow and signaling diagram for providing an application interaction using WAP communications between a mobile phone and an application server.

Referring now to FIG. 13, there is illustrated a message flow and signaling diagram for providing an application interaction using WAP communications between a mobile phone 14 and an application server 30 in accordance with another embodiment of the present invention. In this embodiment, the electronic pen 10 includes a WAP server while the mobile phone 14 includes a WAP client. An application graphical user interface (GUI) is contained on an addressed surface 12. When the electronic pen 10 is used on the addressed surface 12, the position of the tip of the electronic pen 10 can be determined. In this example, the electronic pen 10 is used to check an address book field on the addressed surface 12. When this occurs, the electronic pen 10 detects a portion of the address book field as indicated at 242. The electronic pen 10 then forwards an indication 244 that the address book field has been checked to a network 2 that contains an application engine associated with the application GUI contained on the addressed surface 12. In particular, an application server 30 associated with the application GUI stores instructions for responding to detected portions of the application GUI.

In response to the indication 244, the application server 30 sends (e.g., using a WAP push) a message 246 containing a WAP page that links to the requested address book. The retrieved WAP page is displayed on a display screen of the mobile phone 14 at step 248. The user selects the address book link at step 250 either by checking an appropriate field on the addressed surface 12 with the electronic pen 10 or by inputting the selection via a mobile phone MMI. Depending on which mechanism is used to select the address book link at step 250, a CGI call is sent either from the mobile phone 14 (as indicated at 252) or from the electronic pen 10 in response to the selection of the appropriate field on the address pattern 12 (as indicated at 254).

In this embodiment, the mobile phone 14 and the electronic pen 10 can each have a unique IP address, wherein the mobile phone 14 acts as a router. Alternatively, only the mobile phone 14 has a unique IP address, in which case the phone acts as a proxy towards the electronic pen 10.

Although the application in this and all subsequent embodiments is described as being supported by an application server 30, support for the application could also be located in the electronic pen 10 or the mobile phone 14 instead of in the network 2. In addition, the network based application could use internal mobile phone 14 or electronic pen 10 functions (e.g., a phone book) via a WAP or AT based API. For example, in a web-based short message service (SMS) application, the network-based application could allow the user to interact with a phone book stored inside the mobile phone 14. Finally, although the various embodiments are described in connection with a mobile phone 14 and primarily in connection with WAP, it will be recognized that a PDA or personal computer can be substituted for the mobile 14 and WAP could be replaced with ordinary web functionalities.

Figure 14:
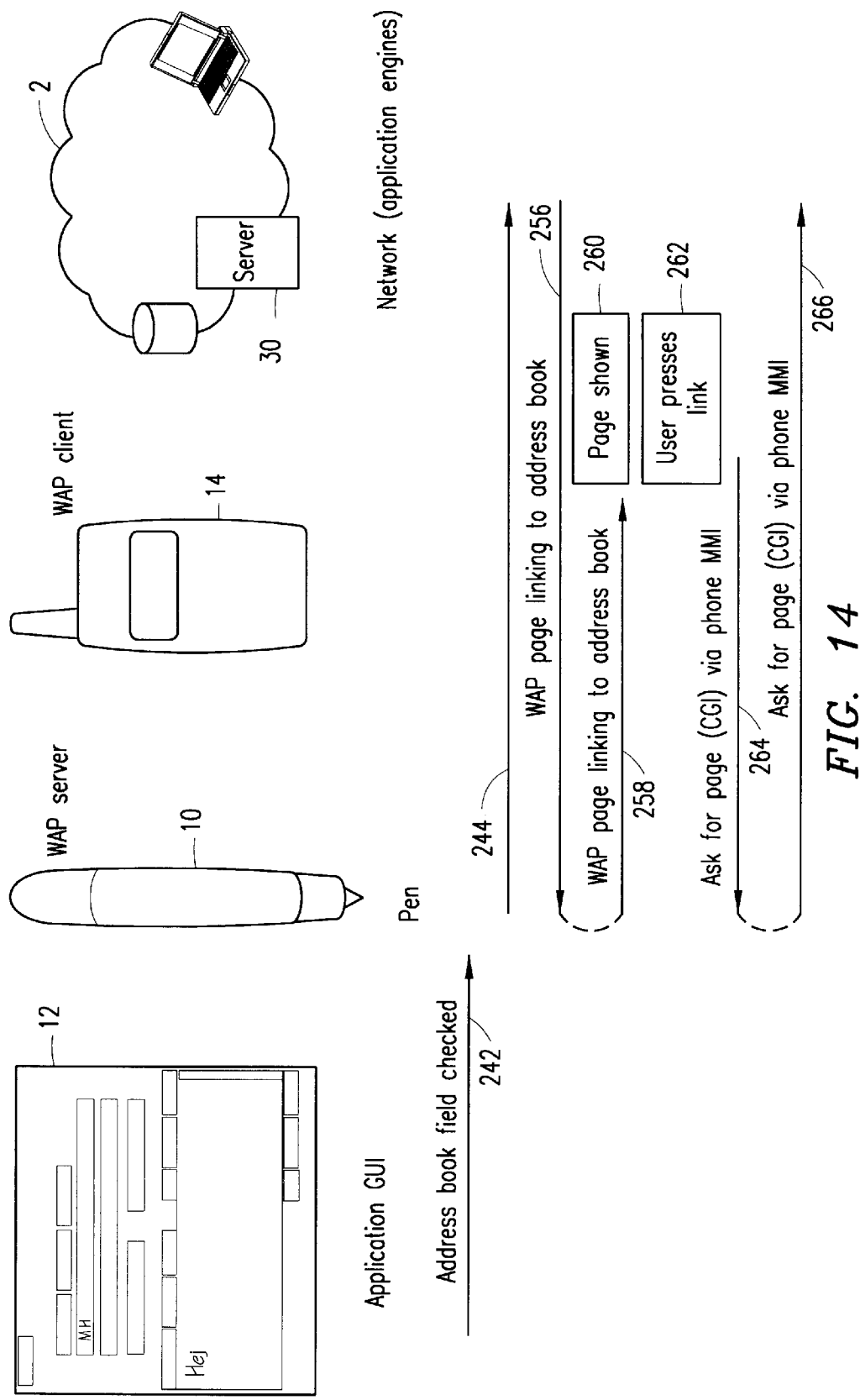
FIG. 14 is a message flow and signaling diagram for providing application interaction using WAP communications wherein the electronic pen acts as a proxy towards the mobile phone.

Referring now to FIG. 14, there is illustrated a message flow and signaling diagram for providing application interaction using WAP communications wherein the electronic pen 10 acts as a proxy towards the mobile phone 14 in accordance with an alternative embodiment of the invention. In particular, the electronic pen 10 is the only device with a unique IP address. Thus, the mobile phone 14 accesses the electronic pen 10 using WAP communications over a Bluetooth radio interface. In addition, the mobile phone 14 accesses the network 2 via the electronic pen proxy. In this case, the electronic pen 10 can be connected to the network 2 either via the mobile phone 14 (e.g., using general packet radio service (GPRS) provided by the mobile phone 14) or via another Bluetooth access point.

When the electronic pen 10 is used to select an address book field, the electronic pen 10 detects a portion of the address book field as indicated as 242. An indication 244 that the address book field has been selected is then forwarded by the electronic pen 10 to the application server 30. In response, a message 256 containing a WAP page that links to the requested address book is sent to the electronic pen's unique IP address. The electronic pen 10 forwards the received WAP page to the mobile phone 14 in a message 258. The mobile phone 14 displays the WAP page on a display screen at 260. At step 262, a user selects the address book link, and in response, a CGI call 264 is sent by the mobile phone 14 to the electronic pen 10, which forwards the CGI call to the application server 30 in a message 266.

Figure 15:
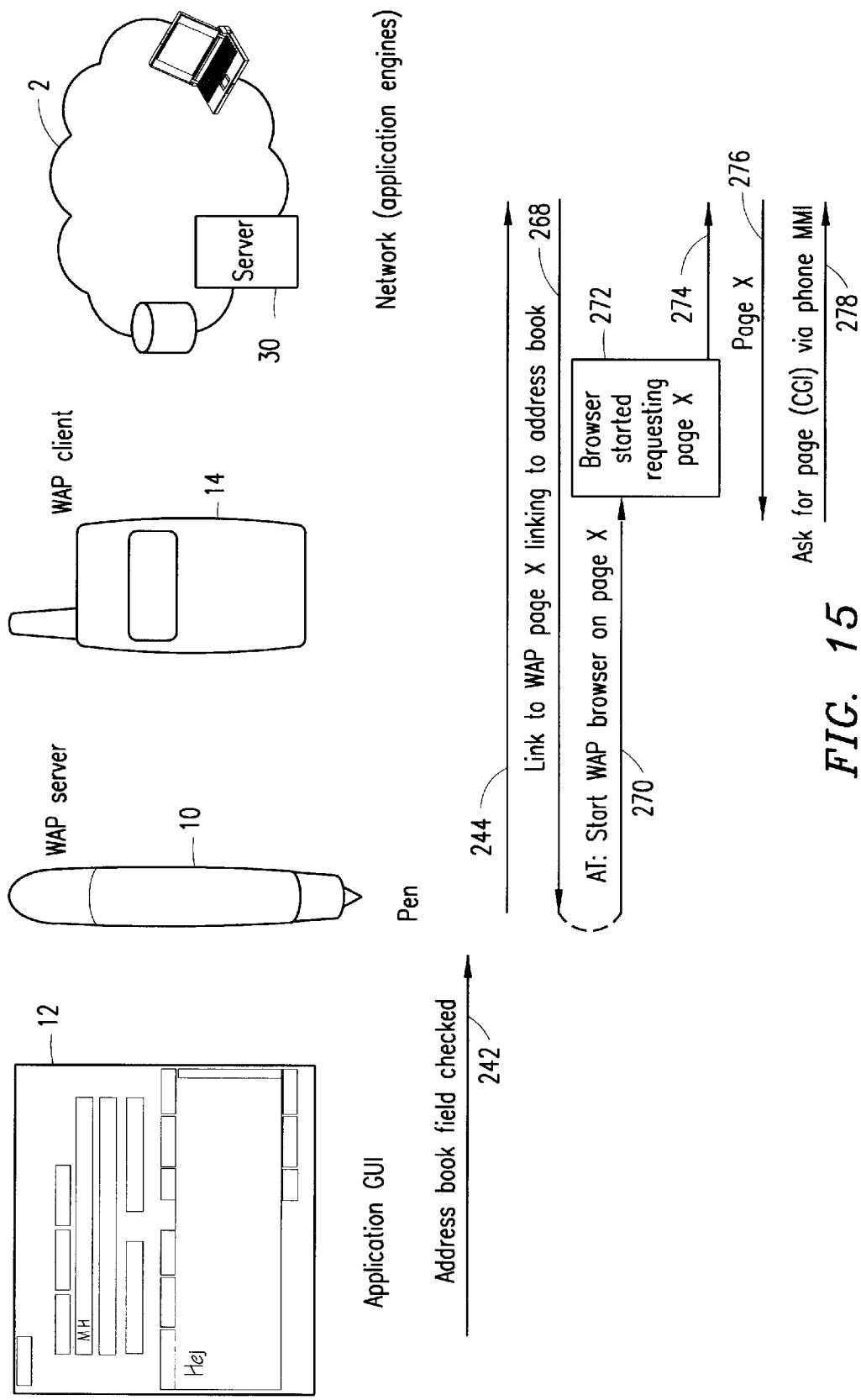
FIG. 15 is a message flow and signaling diagram for supporting application interaction via AT commands between an electronic pen, a mobile phone, And an application server.

Referring now to FIG. 15, there is illustrated a message flow and signaling diagram for supporting application interaction via AT commands between an electronic pen 10, a mobile phone 14, and an application server 30 in accordance with yet another embodiment of the invention. When an address book field is selected on the addressed surface 12 using the electronic pen 10 (as indicated at 242) an indication 244 that the address book field has been selected is sent by the electronic pen 10 to the application server 30. The application server 30 responds by sending a message 268 that contains a link to WAP page X, which links to the requested address book. The electronic pen 10 responds to the message 268 by sending an AT command 270 to the mobile phone 14 requesting that the mobile 14 start its WAP browser on page X.

As a result, the WAP browser is started at step 272, and a request for page X is sent in a message 274 to the application server 30. The application server 30 retrieves the requested page and sends a message 276 containing page X to the WAP browser in the mobile phone 14. The user then selects the link to the address book using the mobile phone MMI, and a CGI call 278 is sent by the mobile phone 14 to the application server 30. In this embodiment, the start of the WAP browser is requested via the electronic pen 10. Although the illustrated example invokes a WAP session that uses direct communications between the mobile phone 14 and the network 2 (as is also illustrated in FIG. 13), it will be recognized that the WAP session could also involve communications via an electronic pen proxy (as illustrated in FIG. 14).

Referring now to FIG. 16, there is illustrated a message flow signaling diagram for providing application interaction using AT commands to create dynamic menus in accordance with another embodiment of the present invention. In this case, a protocol that maps menu content to the dynamic menus in the mobile phone 14 is implemented in the application server 30. The electronic pen 10 could then provide an exact mapping or a higher level mapping, which would offer the application more advanced functions. In addition, the electronic pen 10 could also offer a WAP dynamic menus converter.

When the electronic pen 10 is used to select an address book field on the addressed surface 12 (as in indicated at 242), an indication 244 that the address book field has been selected is sent by the electronic pen 10 to the application server 30. In response, the application server 30 sends a request 280 to the electronic pen 10 to create a menu on the mobile phone 14. The request 280 includes the intended content of the menu to be created. The electronic pen 10 then sends an AT command to the mobile phone 14 to create a menu on the mobile phone 14. As a result, a menu is displayed on a display screen of the mobile phone 14 at step 284. The user chooses a selection from the menu at step 286 using either the mobile phone MMI or the addressed paper 12 MMI. Depending on which MMI is used, the user choice is either forwarded by the mobile phone 14 to the electronic pen 10 as indicated at 288 or is detected as a result of the electronic pen 10 being used to select an appropriate field on the addressed paper 12 as indicated at 292. In either case, the user choice is forwarded to the application server 30 by the electronic pen 10 in a message 292.

Although various preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims. Furthermore, it shall be understood that the terms "comprises" and "comprising," when used in the foregoing Detailed Description and the following claims, specifies the presence of stated features, elements, steps, or components but does not preclude the presence or addition of one or more other features, elements, steps, components, or groups thereof.

What is claimed is:

1. A user interface system, comprising:
    an electronic reading device for detecting a portion of an address pattern;
    a client device for receiving data identifying the detected portion of the address pattern and for requesting an application description corresponding to an area of the address pattern that includes the detected portion of the address pattern, said application description including description of an application to be loaded into the client device; and
    an application server for retrieving the application description in response to the request by the client device, said application server forwarding the application description to the client device.

2. The system of claim 1, wherein the client device further forwards, to the electronic reading device, a grid description for said area of the address pattern.

3. The system of claim 2, wherein the application description includes the grid description.

4. The system of claim 2, wherein the electronic reading device generates at least one stroke using the grid description.

5. The system of claim 4, wherein the electronic reading device further identifies an action based on the at least one stroke.

6. The system of claim 5, wherein the electronic reading device further sends data relating to the action to the client device, the client device processing the action in accordance with the application description.

7. The system of claim 1, wherein the electronic reading device includes the client device.

8. The system of claim 1, wherein the client device comprises one of a mobile station, a personal digital assistant (PDA), a television, and a personal computer.

9. The system of claim 1, further comprising a name server for identifying an address for the application server based on the detected portion of the address pattern.

10. The system of claim 1, further comprising a translation server for receiving data relating to positions detected by the electronic reading device and translating the received data into a text input.

11. The system of claim 1, further comprising a control node for generating real-time control commands.

12. A method of operating a user interface, comprising the steps of:
    detecting a portion of an address pattern with an electronic reading device;

determining a position on the address pattern based on the detected portion of the address pattern;

identifying an application to be loaded corresponding to an area that contains the detected portion of the address pattern; and retrieving a description of the application to be loaded to a local memory, said description including information about the application to be loaded.

13. The method of claim 12, further comprising the step of identifying, based on the detected portion of the address pattern, a location of an application server that stores the application description.

14. The method of claim 12, further comprising the step of retrieving a grid description for the area.

15. The method of claim 14, further comprising the step of determining a plurality of detected positions on the address pattern using the retrieved grid description.

16. The method of claim 15, further comprising the step of processing the plurality of determined positions in accordance with the application description.

17. An electronic reading device, comprising:

a sensor for detecting portions of an address pattern;

a position buffer for storing data identifying the detected portions of the address pattern;

a memory for storing a grid description of a current address pattern area, said grid description being descriptive of actions associated with the detected positions of the address pattern; and a processor for determining an action to be performed based on a plurality of detected positions using the grid description of the current address pattern area, each detected position determined from data stored in the position buffer.

18. The electronic reading device of claim 17, wherein the processor further generates at least one stroke from the plurality of detected positions.

19. The electronic reading device of claim 18, wherein the processor further initiates the action based on the at least one stroke.

20. The electronic reading device of claim 17, wherein the processor further determines whether each detected portion of the address pattern is within the current address pattern area.

21. The electronic reading device of claim 20, wherein the processor requests a grid description of a new address pattern area that corresponds to a particular detected portion of the address pattern when the particular detected portion is determined not to be within the current address pattern area.

22. A method for processing information detected by an electronic reading device, comprising the steps of:

detecting, by the electronic reading device, an initial portion of an address pattern;

retrieving, by the electronic reading device, an address pattern grid that contains the initial detected portion of the address pattern, said address pattern grid identifying actions to be taken based on the detected portion;

storing, in the electronic reading device, the address pattern grid; and identifying a plurality of successive positions corresponding to a plurality of successively detected portions of the address pattern, the plurality of successive positions identified using the stored address pattern grid.

23. The method of claim 22, further comprising the step of generating data defining a stroke from the plurality of identified successive positions.

24. The method of claim 23, further comprising the step of initiating an action that corresponds to the stroke.

25. The method of claim 22, further comprising the step of initiating an action based on the plurality of identified successive positions.

26. The method of claim 22, further comprising the step of determining whether each successive position is within the stored address pattern grid.

27. The method of claim 26, further comprising the step of:

retrieving a new address pattern grid in response to a determination that a particular successive position is not within the stored address pattern grid, the new address pattern grid containing the particular successive position; and storing the new address pattern grid.

28. A method for processing information detected by an electronic reading device, comprising the steps of:

detecting, by the electronic reading device, an initial position on an address pattern;

retrieving an application description containing an address pattern grid description for an application that relates to the detected initial position;

detecting a plurality of successive positions on the address pattern; and processing the plurality of detected successive positions in accordance with the address pattern grid description contained within the application description.

29. The method of claim 28, further comprising the steps of:

identifying an address where the application description is stored, said identification based on the detected initial position; and sending a request for the application description to the identified address.

30. The method of claim 28, wherein the step of retrieving the application description includes retrieving an address pattern grid description, the address pattern grid description used in the step of detecting the plurality of successive positions.

31. The method of claim 28, wherein the step of processing includes converting the plurality of detected successive positions into a data entry.

32. The method of claim 31, further comprising the step of submitting the data entry to an application server associated with the application.

33. The method of claim 31, wherein the plurality of detected successive positions represent handwritten symbols, said conversion into a data entry involving performing a handwriting recognition operation.

34. A system for configuring an electronic reading device, comprising:

an electronic reading device storing configuration instructions;

a separate electronic device including an electronic man-machine interface (MMI), said separate electronic device operating to:

receive the configuration instructions from the electronic reading device;

display at least one configuration option identified in the configuration instructions;

receive, via the electronic MMI, a user selection relating to the at least one configuration option; and send an identification of the user selection to the electronic reading device, said electronic reading device executing a function based on the user selection.

35. The system of claim 34, wherein communications between the electronic reading device and the separate electronic device are performed using wireless application protocol (WAP).

36. The system of claim 35, wherein the electronic reading device includes a WAP server and the separate electronic device includes a WAP client.

37. The system of claim 36, wherein the configuration instructions comprise a WAP page.

38. The system of claim 37, wherein the user selection comprises a selection of a link on the WAP page.

39. The system of claim 35, wherein the identification of the user selection comprises a common gateway interface (CGI) call.

40. The system of claim 34, wherein the configuration instructions use an application program interface (API) for the separate electronic device.

41. The system of claim 34, wherein the at least one configuration option is displayed using a dynamic menu.

42. The system of claim 34, wherein the separate electronic device is selected from the group consisting of a mobile phone, a personal digital assistant (PDA), and a personal computer.

43. A method for configuring an electronic reading device, comprising the steps of:
  receiving configuration data identifying a plurality of configuration options for an electronic reading device, said configuration data received at a separate electronic device;
  displaying the plurality of configuration options on the separate electronic device;
  receiving a user selection of at least one of the plurality of configuration options;
  notifying the electronic reading device of the at least one selected configuration option; and
  executing a function based on the at least one selected configuration option.

44. The method of claim 43, wherein the configuration data is contained in one of a wireless application protocol (WAP) page and a web page, the step of displaying the plurality of configuration options comprising displaying said one of the WAP page and the web page.

45. The method of claim 44, wherein each configuration option comprises a link on said one of the WAP page and the web page.

46. The method of claim 44, wherein the step of notifying comprises sending a common gateway interface (CGI) call to the electronic reading device.

47. The method of claim 46, further comprising the step of executing the CGI call.

48. The method of claim 43, wherein the configuration data conforms to an application program interface (API) for the separate electronic device.

49. A system for interacting with an application, comprising:
  a formatted surface having an address pattern, wherein a position on the address pattern can be determined from a portion of the address pattern;
  an electronic reading device for detecting a portion of the address pattern;
  an application server storing application data associated with the detected portion of the address pattern; and
  an electronic device separate from the electronic reading device, said electronic device operating to receive the application data and display the application data on a display screen, wherein a user makes a selection from the displayed application data using one of the electronic reading device in connection with the formatted surface and a man-machine interface (MMI) for the separate electronic device.

50. The system of claim 49, wherein the separate electronic device is selected from the group consisting of a mobile phone, a personal digital assistant (PDA), and a personal computer.

51. The system of claim 49, wherein the separate electronic device comprises a wireless application protocol (WAP) client.

52. The system of claim 49, wherein the application data comprises one of a wireless application protocol (WAP) page and a web page.

53. The system of claim 52, wherein the user selection is sent to the application server in the form of a common gateway interface (CGI) call.

54. The system of claim 49, wherein the separate electronic device has a unique Internet protocol (IP) address, said separate electronic device acting as a proxy for the electronic reading device.

55. The system of claim 49, wherein the electronic reading device has a unique Internet protocol (IP) address, said electronic reading device acting as a proxy for the separate electronic device.

56. The system of claim 49, wherein the application data received by the separate electronic device is sent via the electronic reading device.

57. A method for interacting with an application, comprising the steps of:
  detecting a portion of an address pattern with an electronic reading device;
  determining a position of the electronic reading device relative to the address pattern based on the detected portion of the address pattern;
  retrieving application data associated with the determined position;
  displaying at least one option from the application data on an electronic device separate from the electronic reading device; and
  receiving a user selection of one of the at least one option.

58. The method of claim 57, wherein the application data comprises one of a wireless application protocol (WAP) page and a web page.

59. The method of claim 58, wherein the user selection comprises a selection of a link on said one of the WAP page and the web page.

60. The method of claim 57, wherein the step of receiving the user selection comprises detecting a portion of the address pattern with the electronic reading device.

61. The method of claim 57, wherein the user selection is received via a man-machine interface on the separate electronic device.

62. The method of claim 57, further comprising the step of sending the application data to the separate electronic device via the electronic reading device.

* * * * *